(12) United States Patent
Dean

(10) Patent No.: US 8,983,776 B2
(45) Date of Patent: Mar. 17, 2015

(54) PROGRAMMABLE ROBOTIC APPARATUS

(76) Inventor: Jason A. Dean, Glenwood Landing, NY (US)

( * ) Notice: Subject to any disclaimer, the term of this patent is extended or adjusted under 35 U.S.C. 154(b) by 1872 days.

(21) Appl. No.: 11/740,654

(22) Filed: Apr. 26, 2007

(65) Prior Publication Data
US 2007/0260394 A1 Nov. 8, 2007

Related U.S. Application Data

(63) Continuation-in-part of application No. 10/631,465, filed on Jul. 31, 2003, now Pat. No. 7,239,944, which is a continuation-in-part of application No. 10/401,266, filed on Mar. 27, 2003, now Pat. No. 7,107,132.

(60) Provisional application No. 60/812,231, filed on Jun. 9, 2006, provisional application No. 60/368,196, filed on Mar. 28, 2002.

(51) Int. Cl.
G05D 1/00 (2006.01)
G05D 1/02 (2006.01)
G01C 21/00 (2006.01)
G06F 19/00 (2011.01)
A01D 34/00 (2006.01)

(52) U.S. Cl.
CPC .............. G01C 21/00 (2013.01); G05D 1/0272 (2013.01); G05D 1/0259 (2013.01); G05D 1/0278 (2013.01); G05D 1/028 (2013.01); G05D 2201/0209 (2013.01); Y10S 901/01 (2013.01); Y10S 901/47 (2013.01)
USPC .............. 701/514; 700/258; 701/23; 701/24; 701/408; 901/1; 901/47

(58) Field of Classification Search
CPC .............................. B25J 19/022; B25J 9/1692
USPC ................ 700/245, 251; 701/207, 200; 901/1
See application file for complete search history.

(56) References Cited

U.S. PATENT DOCUMENTS 4,133,404 A 1/1979 Griffin
4,180,964 A 1/1980 Pansire
(Continued)

FOREIGN PATENT DOCUMENTS

DE 3918867 10/1989

OTHER PUBLICATIONS

AUSA News, Zeus: 'A Very Big Deal'; AUSA News Online; http://www.ausa.org/webpub/DeptAUSANews.nsf/byid/CCRN-6CGM64; Feb. 1, 2003 (2 pages).
(Continued)

*Primary Examiner* — Khoi Tran
*Assistant Examiner* — Dale Moyer
(74) *Attorney, Agent, or Firm* — Milstein Zhang & Wu LLC; Joseph B. Milstein

(57) ABSTRACT

A robotic apparatus for traversing a selected area autonomously that senses orientation relative to "environmental" signals. The robotic apparatus is provided in two models, a master that can record directive and "environmental signal" readings, or that can record received location information, to provide at least one command recorded on a machine-readable medium representing an instruction for traversing an area of interest, and a slave that lacks the recording capability. Both master and slave models can replay recorded commands, and compare the expected orientation from the command with an actual orientation sensed during autonomous operation. If an error exceeding a predetermined value is observed, a corrective action is taken. The robotic apparatus is able to utilize a tool to perform a task.

17 Claims, 19 Drawing Sheets

(56) References Cited

U.S. PATENT DOCUMENTS

| | | | |
|---|---|---|---|
| 4,318,266 | A | 3/1982 | Taube |
| 4,470,119 | A | 9/1984 | Hasebe |
| 4,674,048 | A | 6/1987 | Okumura |
| 4,777,785 | A | 10/1988 | Rafaels |
| 4,851,775 | A | 7/1989 | Kim |
| 4,887,415 | A | 12/1989 | Martin |
| 4,919,224 | A | 4/1990 | Shyu |
| 4,944,140 | A | 7/1990 | Donaghey |
| 5,007,234 | A | 4/1991 | Shurman |
| 5,109,566 | A | 5/1992 | Kobayashi |
| 5,163,273 | A | 11/1992 | Wojtkowski |
| 5,204,814 | A | 4/1993 | Noonan |
| 5,323,593 | A | 6/1994 | Cline |
| 5,748,321 | A * | 5/1998 | Burks et al. .................. 356/635 |
| 5,974,347 | A | 10/1999 | Nelson |
| 6,009,358 | A | 12/1999 | Angott |
| 6,255,793 | B1 | 7/2001 | Peless |
| D451,931 | S | 12/2001 | Abramson |
| 6,339,735 | B1 | 1/2002 | Peless |
| 6,417,641 | B2 | 7/2002 | Peless |
| 6,443,509 | B1 | 9/2002 | Levin |
| 6,493,613 | B2 | 12/2002 | Peless |
| 7,107,132 | B2 | 9/2006 | Dean |
| 7,239,944 | B2 * | 7/2007 | Dean ............................... 701/24 |
| 2002/0154294 | A1 * | 10/2002 | Hedges et al. ............. 356/141.4 |
| 2004/0111196 | A1 * | 6/2004 | Dean ............................... 701/23 |

OTHER PUBLICATIONS

CRS Report for Congress, "Improvised Explosive Devices (IEDs) in Iraq and Afghanistan: Effects and Countermeasures" Order Code RS 22330, Aug. 28, 2007 (6 pages).

Parallax Basic Stamp Model BS1-IC; downloaded from http://www.parallax.com/Store/Microcontrollers/BASICStampModules/tabid/134/txtSearch/BS1/List/1/ProductID/3/Default.aspx?SortField=ProductName%2cProductName on Feb. 7, 2008 (2 pages).

Parallax Basic Stamp Model BS2-IC; downloaded from http://www.parallax.com/Store/Microcontrollers/BASICStampModules/tabid/134/txtSearch/bs2-ic/List/1/ProductID/1/Default.aspx?SortField=ProductName%2cProductName on Feb. 7, 2008 (2 pages).

TS1 Product Information, downloaded from http://www.ramseyelectronics.com/cgi-bin/commerce.exe?preadd=action&key=TS1 on Feb. 7, 2008 (1 page).

* cited by examiner

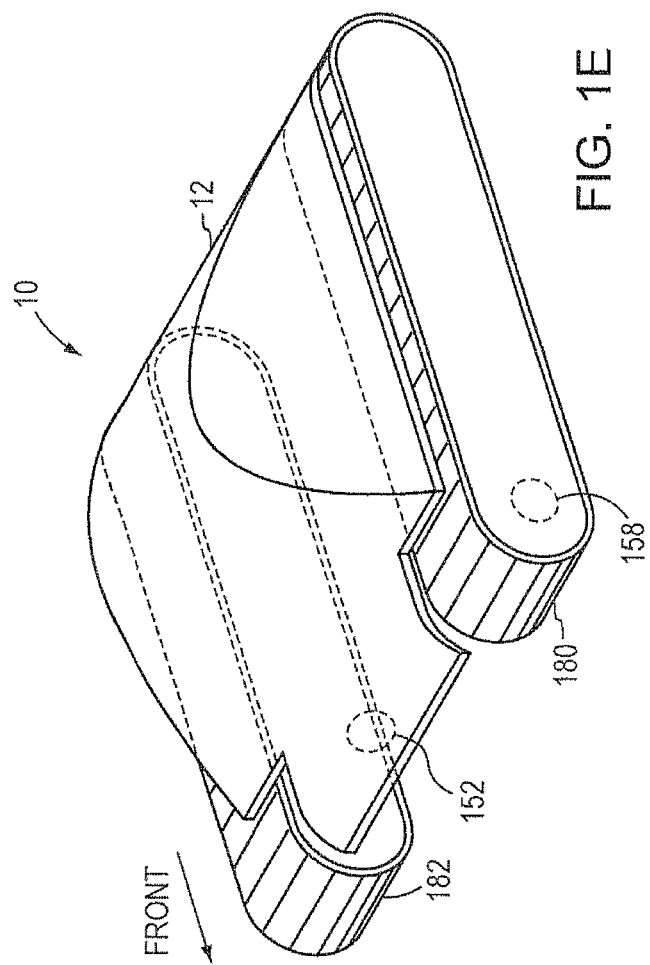

EMITTER       DETECTOR
(SEALED DETECTION TO PROTECT SIGNALS)

FIG. 13
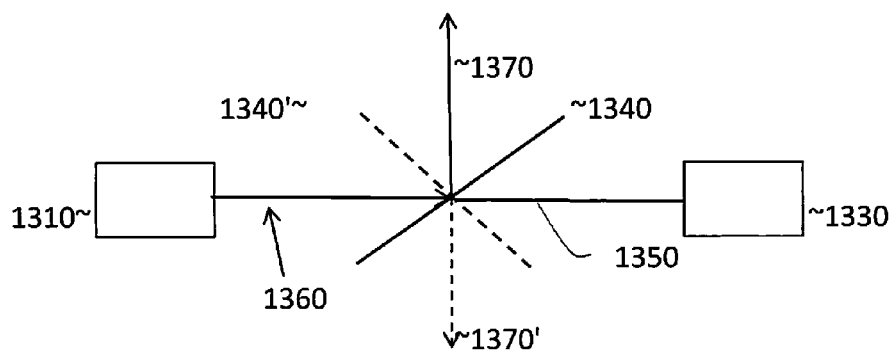

PROGRAMMABLE ROBOTIC APPARATUS

CROSS-REFERENCE TO RELATED APPLICATIONS

This application is a continuation-in-part of co-pending U.S. patent application Ser. No. 10/631,465, filed Jul. 31, 2003, which application is a continuation-in-part of U.S. patent application Ser. No. 10/401,266 filed Mar. 27, 2003, issued as U.S. Pat. No. 7,107,132 on Sep. 12, 2006, and this application also claims, through said U.S. patent application Ser. No. 10/401,266, priority to and the benefit of U.S. provisional patent application Ser. No. 60/368,196, filed Mar. 28, 2002, each of which applications are incorporated herein by reference in its entirety. This application additionally claims the priority and benefit of U.S. provisional patent application Ser. No. 60/812,231, filed on Jun. 9, 2006, which application is incorporated herein by reference in its entirety.

FIELD OF THE INVENTION

The invention relates to mobile robotic apparatus in general and particularly to a robotic apparatus that comprises programmed instructions for traversing an area of interest autonomously.

BACKGROUND OF THE INVENTION

Tasks such as mowing lawns are tedious and can be unpleasant, but are necessary. A common fantasy depicts a homeowner relaxing in a hammock with a cool drink on a warm summer day, possibly in the shade of a tree, while a robotic device mows the lawn.

The prior art includes a number of patents issued for robotic lawnmowers. U.S. Pat. No. 4,777,785, issued on Oct. 18, 1988 to Rafaels, describes a method of guiding a robotic lawnmower that relies on pairs of sensors, one of which emits and one of which detects electromagnetic radiation. U.S. Pat. No. 4,887,415, issued on Dec. 19, 1989 to Martin, describes a robotic lawnmower that relies on infrared obstacle detectors to provide guidance signals. U.S. Pat. No. 5,163,273, issued on Nov. 17, 1992 to Wojtkowski et al., describes a robotic lawnmower that relies on a buried wire to provide guidance. U.S. Pat. No. 5,974,347, issued on Oct. 26, 1999 to Nelson, describes a robotic lawnmower that relies on a plurality of radio transmitters to provide guidance signals. U.S. Pat. No. 6,009,358, issued on Dec. 28, 1999 to Angott et al., describes a robotic lawnmower that relies on a plurality of transceivers, one that transmits signals having different propagation velocities, and one that receives the signals. German Patent No. DE3918867, which was published on Oct. 19, 1989, also describes a robotic lawnmower that employs buried iron bars as a guidance system. Friendly Robotics is the assignee of U.S. Pat. Nos. 6,255,793, 6,339,735, 6,417,641, 6,443,509, and 6,493,613, and U.S. Design Pat. D451,931, directed to robotic lawnmowers that use proximity sensors to detect predefined boundaries.

The manual cutting of an edge is a variation on the installation of boundaries, paths, buried wires, or transmitters. Some robotic lawn mowers rely on distinguishing the cut height of grass from the uncut, taller grass, and following the edge. One example is described in U.S. Pat. No. 4,133,404, issued Jan. 9, 1979 to Griffin. A manually cut edge or border is simply another predefined boundary or path, one that needs to be "reinstalled" before each occasion when the grass is to be cut.

One problem that is common to each of the robotic systems described above is the need to provide and to locate transmitters or other indicators of a desired path or boundary. The necessity to place such transmitters or other locators involves considerable expenditure of time, effort, and funds, and may require precise measurements over considerable distances. Alteration of the desired actions of the robotic apparatus may require further time, effort, and funds to change the configuration of the previously defined path or boundary. There is a need for a robotic apparatus such as a lawnmower that can operate autonomously without the necessity to define either a path or a boundary by the placement of transmitters or other indicators.

SUMMARY OF THE INVENTION

In one aspect, the invention relates to a programmable robotic apparatus. The programmable robotic apparatus comprises a drive system and a drive mechanism useful to provide the apparatus with mobility; a control module in electrical communication with said drive system, said control module configured to command the motion of the programmable robotic apparatus; a memory module in electrical communication with the control module, the memory module configured to store and retrieve information, a transmitter in electrical communication with said control module, said transmitter configured to transmit a signal comprising at least a unique identifier associated with the robotic apparatus; and a receiver in electrical communication with said control module, said receiver configured to receive a signal comprising location information; whereby said robotic apparatus is able to discern at least one of a location and an orientation of said programmable robotic apparatus. The drive mechanism comprises a plurality of independently operable structures that allow the robotic apparatus to move or locomote, such as treads or wheels or other motive mechanisms, and the structures necessary to drive such motive means, such as one or more motors.

In one embodiment, the apparatus is configured to operate autonomously based at least in part on information stored in the memory module. In one embodiment, the programmable robotic apparatus further comprises a tool. In one embodiment, the tool is configured to perform a selected one of a mechanical operation and an optical operation. In one embodiment, the memory module is selected from the group consisting of a magnetic tape, a floppy disc, a hard disc, a CD-ROM, a CD-RW disc, RAM, EPROM, EEPROM, and a flash memory. In one embodiment, the programmable robotic apparatus is configured to discern at least one of a location and an orientation based on a reception or a transmission of at least one terrestrial environmental signal. In one embodiment, the at least one terrestrial environmental signal comprises one or more of a cellular telephone communication signal, a radio broadcast signal, and a television broadcast signal.

In one embodiment, the programmable robotic further comprises a command receiver module in electrical communication with the control module. In one embodiment, the command receiver module is configured to receive signals from a portable transmitter. In one embodiment, the command receiver module is configured to receive signals comprises directives.

In another aspect, the invention features a method of operating a programmable robotic apparatus. The method comprises the steps of providing the programmable robotic apparatus, providing at least one command recorded on a machine-readable medium, the at least one command representing an instruction for traversing an area of interest, operating the programmable robotic apparatus according to the at least one command recorded on the machine-readable medium, discerning at least one of a location and an orientation of the programmable robotic apparatus, comparing the at least one of the location and the orientation of the programmable robotic apparatus to a corresponding one of a location and a direction recorded in the at least one command to determine an error signal, and in the event that the error signal exceeds a predetermined value, commanding the programmable robotic apparatus to take a corrective action, whereby the programmable robotic apparatus autonomously traverses an area of interest.

In one embodiment, the steps of discerning at least one of a location and an orientation, comparing at least one of the location and the orientation, and in the event that the error signal exceeds a predetermined value, commanding the programmable robotic apparatus to take a corrective action, are performed iteratively during a period of operation of the programmable robotic apparatus.

In one embodiment, the method further comprises the step of performing an operation with a mechanical tool attached to the programmable robotic apparatus. In one embodiment, the programmable robotic apparatus stands in one location during the operation with the mechanical tool.

In yet another aspect, the invention relates to a method of providing at least one command recorded on a machine-readable medium for controlling a programmable robotic apparatus, the at least one command representing an instruction for traversing an area of interest. The method comprises the steps of providing a programmable robotic apparatus, operating the programmable robotic apparatus under external control, the programmable robotic apparatus receiving directives from an external source and traversing an area of interest, taking readings from a receiver of the programmable robotic apparatus, the receiver configured to receive a signal comprising location information, and recording the directives and readings on a machine-readable medium for later recovery.

In one embodiment, the directives are recorded in the format in which the directives are received. In one embodiment, the directives are recorded in a different format from the format in which the directives are received.

In a further embodiment, the invention features a computer program recorded on a machine-readable medium. The computer program comprises a supervisory module that controls the autonomous operation of a programmable robotic apparatus and that, as required, receives information recorded on a machine-readable medium, an orientation receiver module that derives orientation information from a signal received by a receiver of the programmable robotic apparatus, and a computation module that computes an error signal based at least in part on orientation information derived from the environmental signal detection module and information recorded on the machine-readable medium.

In one embodiment, the computer program further comprises an instruction receiver module that receives directives from an external source regarding operation of the programmable robotic apparatus. In one embodiment, the computer program further comprises an error correction module that, in the event that the error signal exceeds a predetermined value, computes an error correction to be provided as a corrective action command to the programmable robotic apparatus.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1E is an illustrative perspective representation of a robotic apparatus, according to principles of the invention;

FIG. 13 is a schematic diagram showing the construction and operation of a "wall" laser. Laser 1310 emits laser light along line 1360. Mirror 1340 is attached to motor 1330 by way of shaft 1350. Mirror 1340 is oriented at an angle of 45 degrees to line 1360. As motor 1330 rotates mirror 1340, the mirror assumes the position shown in dotted line as 1340' after a rotation of 180 degrees. Mirror 1340 assumes positions intermediate to position 1340 and position 1340' during the rotation. Laser light reflected from mirror 1340 follows the direction of arrow 1370, to impinge on a surface of ceiling 1380. Laser light reflected from the mirror in position 1340' follows the direction of arrow 1370', to impinge on a surface of floor 1390. As the mirror rotates, the laser light appears as a line along both of the floor and the ceiling, and the laser light 1370, 1370' is projected in a series of positions that form a plane or a "wall," hence the name "wall" laser. For rapid enough rotation (e.g., above about 16 revolutions per second) the two lines appear to the human eye to be continuous.

FIG. 15 shows an operator wearing a backpack that contains a control unit that includes a computer and a transmitter that communicates with the two programmable robotic apparata. When the two robotic apparata each emit a laser signal in the form of a plane or wall of light, the intersection of the two "walls" or planes of light defines a location of interest.

DETAILED DESCRIPTION

Figure 1A:
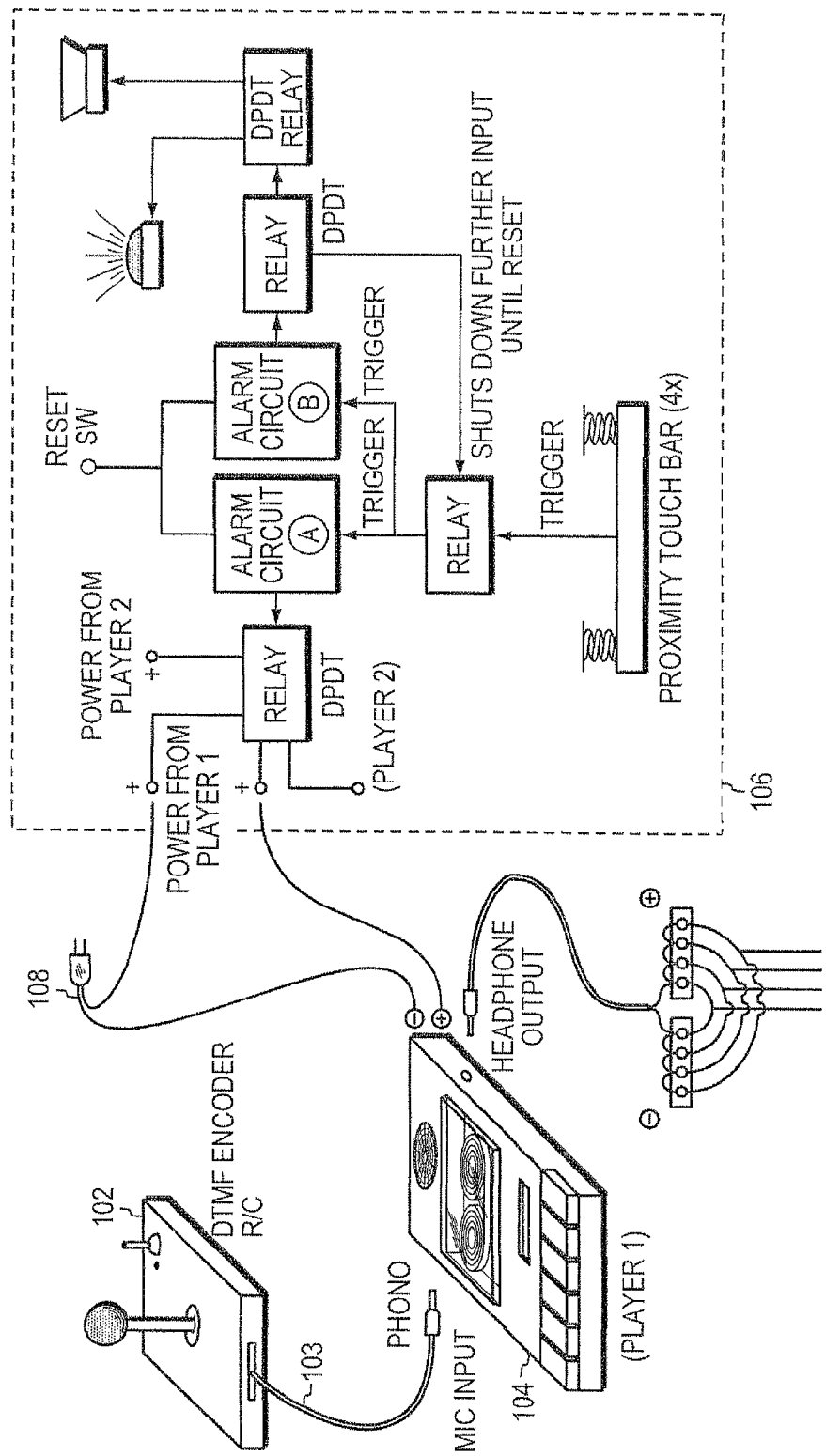
FIGS. 1A-1D illustrate an exemplary embodiment of a robotic apparatus suitable for mowing lawns that traverses an area autonomously, according to principles of the invention.

Robotic apparatus built and operated according to principles of the invention provide systems and methods for operating in an autonomous manner under the control of a programmed computer operating in communication with a digital compass configured to discern an orientation of the robotic apparatus. In one embodiment, the digital compass senses the magnetic field of the planet Earth. The digital compass can be implemented as a device built on a circuit board, which can discriminate two or three axial directions. Orientation readings provided by the compass are used during the operation of the robotic apparatus. An electronic digital compass suitable for use with the present invention is described in U.S. Pat. No. 4,851,775, issued on Jul. 25, 1989 to Kim et al., and assigned to Precision Navigation, Inc. of Menlo Park, Calif., the entire disclosure of which is expressly incorporated herein by reference in its entirety. Electronic digital compasses of this type are available commercially from Precision Navigation, Inc., for example as the Vector 2X electronic digital compass. Technical application notes for the Vector 2X electronic digital compass were available at the time of filing of the application from Precision Navigation, Inc.

In alternative embodiments, the electronic digital compass can be replaced with other apparatus for detecting the location of the robotic apparatus relative to a signal that is not provided for use with a specific area of interest that the robotic apparatus will traverse, but rather is provided for other purposes, but can be adapted to the use of the robot. A first example includes the detection of signals from a plurality of satellites in orbit about the planet Earth, such as Global Positioning System (GPS) signals with a GPS detector. Another example is the detection of signals from a plurality of cellular telephone communication towers erected at known locations using cellular telephone technology, and locating a robot by triangulation. A still further example is the detection of signals from a plurality of radio or television broadcast antennas or towers or broadcast satellites using appropriate detector technology, and locating the robot by suitable calculation using the known location of the signal source. In each such example, the presence of the GPS satellites and their signals, the presence of cellular telephone communication towers and the signals associated with them, or the presence of radio or television broadcast antennas or towers or broadcast satellites and the signals associated with them, are all provided independently of the robot or its purposes, and may be considered "environmental" signals that occur in the environment without any action on the part of the robot or its operator, in analogy to the magnetic signals present as a consequence of the magnetic properties of the planet Earth. Thus, a robot having one or more detectors suitably configured to receive and to decode any of such "environmental signals" can be programmed to operate in a manner similar to a robot having an electronic digital compass. For the purposes of this discussion, the term "environmental signal" will be understood generally as any artificial signal that is provided for purposes other than for the demarcation of a particular area or path of interest, and that is exploited by a robotic apparatus for traversing an area or a path of interest. The "environmental signals" are detected by a respective one of an environmental signal detector module, such as a GPS detector, a cellular telephone signal detector, or a radio or television signal detector. In using such "environmental signals," in some embodiments a plurality of locations of the robot are determined as it moves, and a vector heading or orientation is derived from two or more deduced locations.

Yet another example of using an "environmental signal" involves a two-part communication. In one embodiment, the robotic apparatus comprises a transmitter and a receiver. The transmitter can in various embodiments be the transmitter found in a cellular telephone, a transmitter such as portable radio device such as a citizen's band radio, or a radio frequency transmitter such as is found in RF-ID technology. The receiver is any receiver that can receive a signal comprising location information. Each robotic apparatus is assigned a unique identification code or number, such as is found in devices of the types mentioned in the previous sentence. When in operation, a robotic apparatus periodically broadcasts at least its unique identification code or number as a message to one or more stations that can identify the source of the message and to locate that source, for example, in a geographical manner. The robotic apparatus can optionally include a "time stamp" or an ordinal value in each message so that a particular message can be identified in a sequence of messages. The stations receive the message or messages, determine the location of the transmitter, and send back to the robotic apparatus a message that including the deduced location of the robotic apparatus. The robotic apparatus uses the location information in the same way it would use location information such as it would deduce using the electronic digital compass described hereinabove. The location information can also be used to calculate a direction of motion by comparing successive locations vectorially.

One method of locating the source of the message is triangulation using direction finding. Another method of locating the source of the message is using "time of flight" with multiple receiver stations. Each receiver station identifies the time of receipt of a particular message. In the event that the robotic apparatus and all of the receiver stations have internal clocks that are synchronized, the distance of the robotic apparatus from each receiver station can be computed directly from the time delay of the transmitted message and the known speed of propagation of the signal. The speed of signal propagation can be calibrated by sending a signal between two receiver stations spaced a known distance apart (e.g., from one cellular telephone cell tower to another tower). The clocks can be periodically reset using one of the clocks as a master, so as to maintain synchrony.

In an embodiment in which a set of synchronized clocks does not exist, or if a time signal is not used, the location of the robotic apparatus can be identified as follows. For any two receiver stations, the difference in time that the same signal is received at two different receiver stations indicates a difference in distance of the robotic apparatus from the two receive stations. In other words, simultaneous reception (e.g., time difference equals zero) indicates that the robotic apparatus is positioned along a line perpendicular to the line connecting the two receiver stations, the perpendicular line intersecting the line connecting the two receiver stations at its midpoint.

As the time difference increases, the locus of the possible positions of the robotic apparatus becomes a curvilinear line offset from the aforementioned perpendicular line by a distance x along the line connecting the two receiver stations such that the difference in transit time of the signal is that observed, and meeting the perpendicular line at substantially infinite distance in either direction along the perpendicular line (i.e., at those points where the difference is negligible relative to the absolute distance of the robotic apparatus from either receiver station). By knowing the transit time for a signal between the two locations of the receiver stations, which can be measured, the magnitude of the distance x can be estimated. The precision of measurement of the difference in time of flight of the signal determines the precision of the measurement of the distance x. By measuring a sufficient number of such pairs of time of flight differences, such as three pairs, a location of the robotic apparatus can be identified unambiguously in two dimensions, i.e., on the surface of the Earth, neglecting curvature of the Earth and changes in altitude of different locations. Measuring more that three pairs will give better resolution and added confidence in the accuracy of a location determination. In an alternative embodiment, the receiver stations send the raw data that they receive back to the robotic apparatus, and the computation of a location is performed at the robotic apparatus. In still other embodiments, the signals transmitted by the robotic apparatus and/or the receiver stations are communicated using any convenient electromagnetic radiation, including any of infrared, visible and ultraviolet light, and radio waves in the Kilo-Hertz to the GigaHertz frequency range.

Present day systems, such as Enhanced 911 are being deployed by multiple telephone companies to locate cellular telephones over long distances (miles) to within 50 to 100 meters, as is described in an article entitled "They Know Where You Are," that appeared in the July 2003 issue of IEEE Spectrum magazine at pages 20-25. The same article indicates that RF-ID tags can locate objects over distances of meters. Neither of these technologies as disclosed in the article is sufficient for the distances required while providing the accuracy of positioning required in the present invention.

Another embodiment discussed in the IEEE Spectrum article is ultrawideband transmission, which is capable of locating an object over a distance of approximately hundred of meters to perhaps a kilometer (0.62 mile) with an accuracy of approximately one-half meter (approximately 20 inches) to ten meters (approximately 32 feet). Accuracy of one centimeter at distances of one kilometer can be foreseen, but is not yet available. In addition, the apparatus needed for such transmissions is expensive at present, costing about $2000 per base station and about $25 per mobile transponder.

In one embodiment, the invention finds use as a robotic apparatus that can traverse an area of interest autonomously. In one exemplary embodiment, the robotic apparatus is a lawn mowing machine.

In one embodiment, a robotic apparatus has two substantially similar electric motors located on opposite sides of the apparatus, each connected to the frame or chassis with bolts or the like. Speed reduction gears reduce the output rotational speed of each motor. As will be described, the rotational speed and direction of each motor is individually adjustable. The two motors are configured to be controlled individually. A drive system on each side of the robotic apparatus, such as a chain drive connected to a sprocket on a wheel assembly, provides power from each motor to a corresponding wheel. A rubber track is provided on each of the two sides of the chassis. Each track is fastened to one or more wheels, one of which is the wheel driven by the motor, which track moves the robotic apparatus as required.

In one embodiment, a robotic apparatus intended for use as a lawn mower is operated primarily through the use of a gasoline-powered engine. In one embodiment, the apparatus derives its electrical energy needs by employing an alternator driven by the gasoline-powered engine. The gasoline-powered engine also drives a rotating vertical shaft that supports a cutting blade. The blade is connected to the motor by way of a clutch mechanism, so that the motor can remain in operation while the cutting blade can be disengaged. A portion of the AC current generated by the alternator is then converted to DC power to provide for the energy needs of the remaining circuits.

In one embodiment, a machine of the invention is capable of recording directives and digital compass readings while in operation for later playback, can play back recorded instructions, and can operate autonomously according to the recorded instructions. The directives can be provided from an external source. In one exemplary embodiment, a person uses a hand held device such as a cell phone to issue commands that include directives by pressing buttons on the cell phone. For convenience of exposition, a machine with this recording capability will be called a master. In some embodiments, a record and playback device can be remote from the master robotic apparatus and bi-directional communication between the master robotic apparatus and the record and playback device can occur by short-range radio, for example using the 802.11 protocol. In another embodiment, a machine of the invention lacks the feature of recording instructions, but can play back pre-recorded instructions, and can operate autonomously according to the pre-recorded instructions. For convenience of exposition, such a machine will be referred to as a slave. In some embodiments, a slave machine may also lack the feature of receiving directives from an external source, such as a remote control, but instead operates based on recorded information and a start command or the like issued by manipulation of a control, such as a key or a button on the apparatus. In some embodiments, a slave machine can employ a playback device that would be unsuitable for a master machine (i.e., a device lacking recording capability but having playback capability), such as a CD-ROM player, a magnetic tape player, or the like. Such playback-only devices are useful because they have fewer parts (i.e., less that can fail and require repair), and they may be less costly to acquire and use. In some embodiments, a playback device can be remote from the slave robotic apparatus and bi-directional communication between the slave robotic apparatus and the playback device can occur by short-range radio, for example using the 802.11 protocol.

A machine according to the invention, which in one embodiment is powered by a gasoline engine, and in other embodiments is powered electrically, provides mobility through two independently operated electric motors that power treads, which can be rubber tracks. The invention also provides a computer program recorded on a machine-readable medium that operates on a computer, which can be a commercially available microprocessor. One or more programmed computers provide the ability to control the behavior, including guiding a course of motion of the robotic apparatus, and controlling the use of tools that are attached to the robotic apparatus.

Because both master and slave machines according to the invention use the Earth's magnetic field as a reference, there is no requirement for the installation of any artificial objects such as transmitters or barriers to control the motion or behavior of the programmable robotic apparatus when it is operating autonomously. The magnetic field of the planet Earth is a natural phenomenon that does not require the intervention of a human for its presence. When a command or commands recorded on a machine-readable medium are provided to the apparatus, the apparatus can operate autonomously and can take corrective action when it senses that it has deviated from the expected operational behavior.

Turning to FIGS. 1A-1D, there is shown an exemplary embodiment of an apparatus suitable for mowing lawns that traverses an area autonomously. The relationship of FIGS. 1A-1D is shown schematically on FIG. 1C. FIG. 1A shows a remote input device 102 that a user employs for issuing directives, which in one embodiment is a joystick configured to generate DTMF tones in response to manipulations by the user. In other embodiments, the remote input device 102 is a hand held device such as a cell phone that can generate DTMF signals. When a remote input device 102 is used, there is a corresponding command receiver module configured to receive signals from the remote input device or portable transmitter 102. The signals sent by the remote input device comprise directives. The DTMF signals are communicated to a memory module 104 that is configured to store and retrieve information. While being recorded, the DTMF signals are also sent to a DTMF decoder for processing, so as to provide directives to operate the robotic apparatus. In the embodiment of FIG. 1A, memory module 104 is a tape recorder that can record the DTMF signals. In the embodiment shown, the DTMF signals are sent out through the recorder's earphone output jack by wire to be decoded by a DTMF decoder. In other embodiments, the memory module is any device that can store and retrieve information, such as on a floppy disc, a hard disc, a CD-RW disc, RAM, EPROM, EEPROM, and a flash memory. In some embodiments, the directives are recorded in the same format as the format in which they are received. In other embodiments, the directives are recorded in a format different from the format in which the directive is received.

Figure 2:
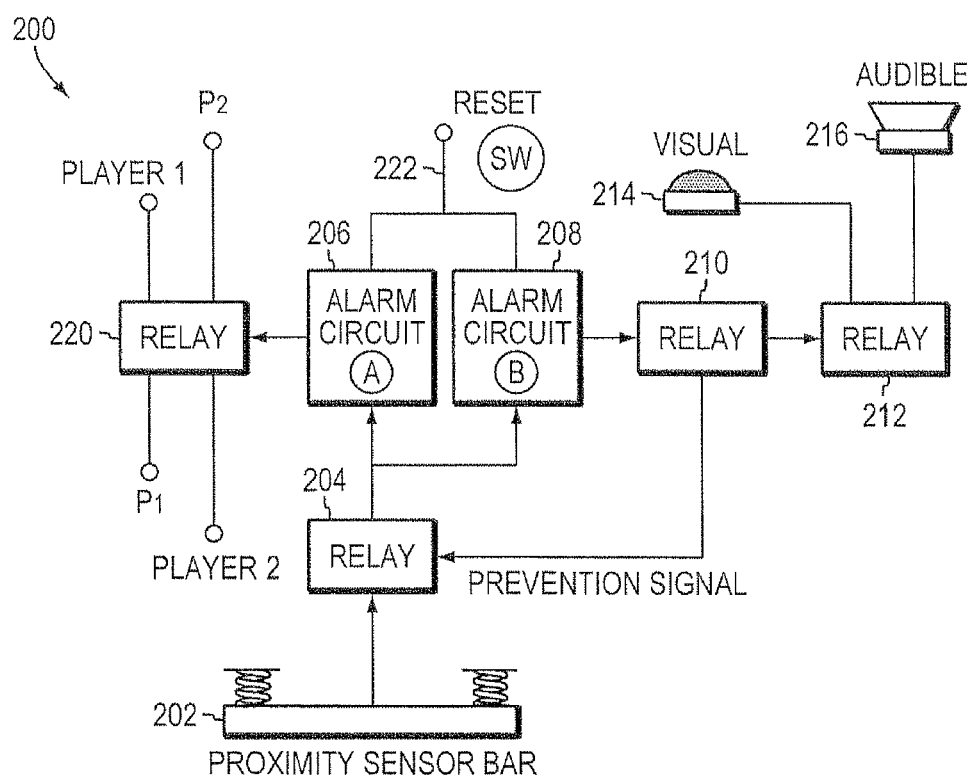
FIG. 2 illustrates an exemplary embodiment of an alarm circuit, according to principles of the invention.

In the embodiment of FIG. 1A, the connection between the input device 102 and the memory module 104 is a cable 103. In other embodiments, the connection can be made by electromagnetic wave signals, such as infrared, light, radio waves, and microwaves. An optional alarm circuit 106, which is shown and described in more detail in FIG. 2, is in electrical communication with memory module 104. A power source 108 is shown as an electrical wall plug, to schematically indicate a source of electrical power to operate the circuitry described herein. The electrical power source can be a battery, an alternator run from a combustion engine mounted on the robotic apparatus, a fuel cell, or any other convenient source of electrical power.

Figure 1B:
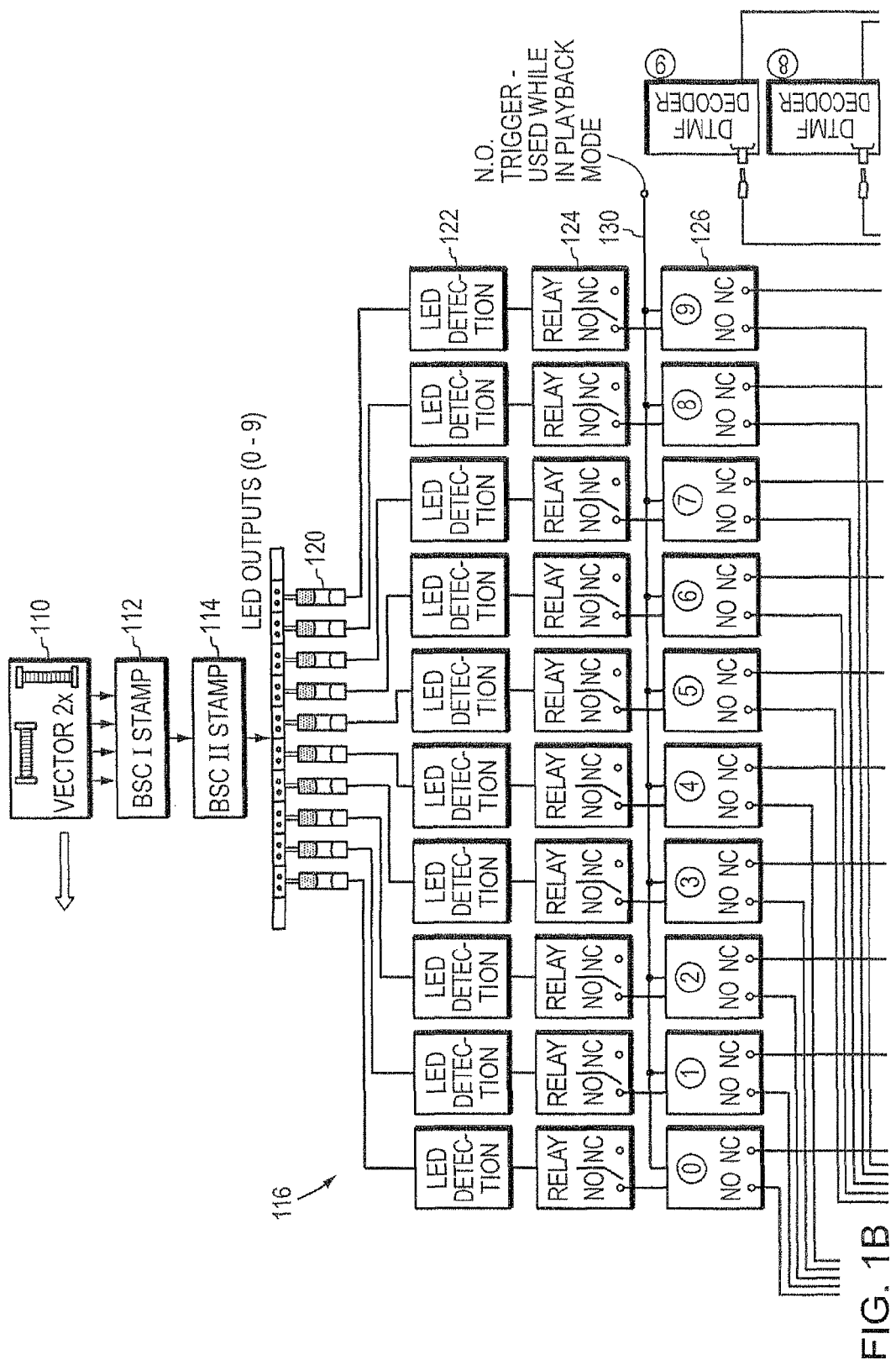

Turning to FIG. 1B, there is shown a compass module 110, which in one embodiment is a Vector 2X electronic digital compass. The compass module is in electrical communication with a computer 112, which in one embodiment is a Parallax Basic Stamp Model BS1-IC, available from Parallax, 599 Menlo Drive, Suite 100, Rocklin, Calif. 95765. Information about the BS1-IC and the BS2-IC were available at the time of filing of the application from Parallax. Other computers 112 that can be used for interfacing with the Vector 2X electronic digital compass are the Motorola 68HC705C8 processor, the Intel 8751 processor, the Maxim MAX7651 processor, or the like. The computer 112 is programmed with a computer program recorded on a machine-readable medium, such as a program recorded on a memory medium, which medium can be of the type of any of the memory media listed hereinabove. The computer program operating on computer 112 comprises an orientation receiver module that receives orientation information from the compass module 110. As will be understood, one adjusted, by being moved or by removing the object, before the reset 222 is activated.

The computer program also includes other modules that perform specific functions for the operation of a robotic apparatus. These modules comprise a supervisory module that controls the autonomous operation of a programmable robotic apparatus and that, as required, receives information recorded on a machine-readable medium, and a computation module that computes an error signal based at least in part on orientation information from the compass module and information recorded on the machine-readable medium. The program in some embodiments further comprises an instruction receiver module that receives directives from an external source regarding operation of the programmable robotic apparatus. The program in other embodiments further comprises an error correction module that, in the event that the error signal exceeds a predetermined value, computes an error correction to be provided as a corrective action command to the programmable robotic apparatus.

As indicated in the embodiment shown in FIG. 1B the computer 112 communicates with another computer 114. The computer 114 as depicted is also a Parallax Basic Stamp Model BS1-IC. In other embodiments, the computers 112 and 114 can be the same computer. Various aspects of the computer program described above can be divided between computers 112 and 114 in embodiments where they are distinct computers. In general, it is not critical where a particular module resides or is operative. Microprocessors are available that have sufficient computational power and speed to be successfully applied in embodiments of the invention. Another issue in addition to power and speed may be the unit cost of the microprocessor. In the future, there will likely be many additional microprocessors that are even more powerful and even less costly than those available today, and which may include some of the features necessary for operation of embodiments of the invention. For example, a new line of chips was introduced on Mar. 12, 2003 by Intel Corporation under the trademark Intel® Centrino™. Some of the features of such newer chipsets include wireless communications, features designed to enable extended battery life, make possible thinner and lighter mobile computer designs, and improved mobile performance.

As depicted in FIG. 1B, the computer 114 generates instructions for the operation of the robotic apparatus, which can be communicated electrically to the electromechanical portions of the apparatus. In the embodiment of FIG. 1B, the computer 114 communicates by way of a plurality of opto-isolators 120 which are shown in greater detail in FIG. 3A as described below. In one embodiment, there are ten communication channels each having an opto-isolator 120 therein. Circuitry 122 for detecting a signal from an LED is provided for each opto-isolator 120. An exemplary embodiment of a detection circuit for detecting the presence of light from an LED is shown in FIG. 3B and described in greater detail with regard to that figure. For each communication channel, the circuitry 122 drives a corresponding relay 124 based on the state of the detected signal (i.e., "on" or "off"). Each relay 124 is connected to another relay 126 that has a normally open trigger connection 130. The trigger 130 is used in what will be called "playback" mode, corresponding to operation using pre-recorded instructions in the form of directives and compass readings. In the mode of operation under control by an external source, which will be called "command" mode or "live" mode, such as control by a user providing signals from a portable transmitter, the trigger input 130 is held high. When in "command" mode, the relays 126 communicate their signals by way of their "normally closed" contact to DTMF encoders 132. In one embodiment, the least significant digit of each numeric value generated by the compass is ultimately stored as a unique DTMF tone when in "command" mode. When in "playback" mode, the relays 126 communicate their signals by way of their "normally open" contacts to circuitry 140, 142 that decodes the least significant, or "units" digit of a reading obtained from the compass module 110.

The compass module 110 and the computers 112, 114 are used to measure the orientation of the compass module 110 (and thereby the orientation of the robotic apparatus to which it is mechanically attached) relative to the magnetic field of the planet Earth. The compass module can be oriented with regard to the robotic apparatus by attaching the compass module 110 to the robotic apparatus, and aligning one of its magnetic coils along a desired direction (such as directly forward) and aligning another of its magnetic coils in a perpendicular orientation to the desired direction so as to define a plane that is substantially parallel with respect to a plane upon which the robotic apparatus rests when the compass module is attached.

The compass module 110 provides electrical signals that can be decoded to derive a magnetic compass heading in increments of one degree, ranging from zero degrees to 359 degrees. For the purpose of controlling the robotic apparatus, an angular correction of one degree or less is sufficient for acceptable operation. In order to observe a change in direction, it is sufficient to observe the change of the least significant digit (or units digit) value of the decoded heading. For example, a change in direction from 72 degrees to either 73 degrees or 71 degrees involves observing the change of the least significant digit value "2" to either "3" or "1." Therefore, decoding signals from the compass 110 so that the least significant digit (i.e., ranging from 0 through 9) is discriminated provides enough signal to deduce that an error has occurred and that a correction is needed. For appreciable changes in direction, for example in excess of 9 degrees, a counter is implemented to tally the successive changes of one degree so as to have available a new heading relative to a previous heading. One can also calibrate the compass to obtain a "true" magnetic heading if that is necessary. The calibration process is explained in U.S. Pat. No. 4,851,775, previously incorporated herein by reference.

Figure 1C:
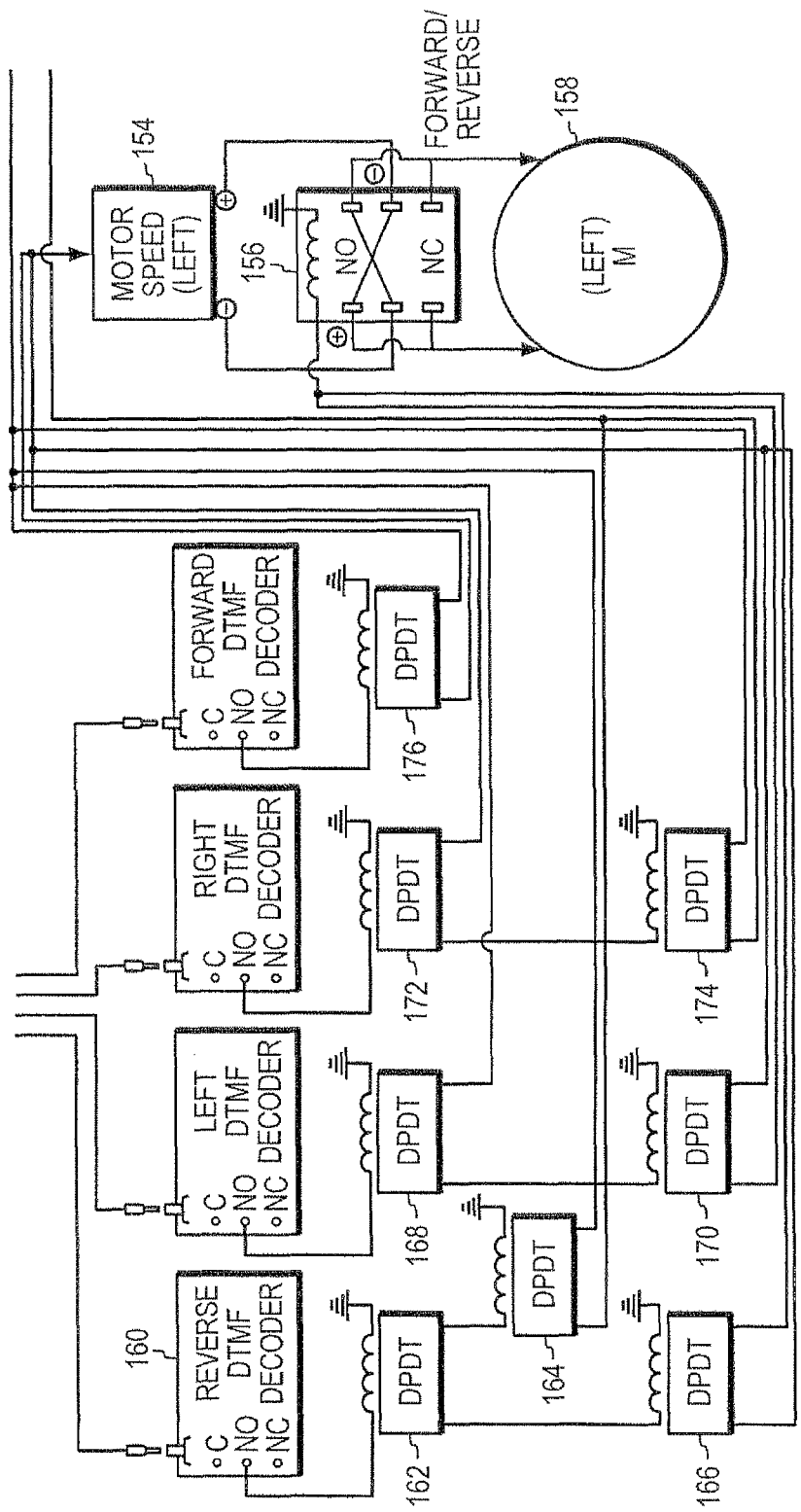

Turning to FIG. 1C, during operation in the "command" mode, signals from the remote input device 102, or during operation in the "playback" mode, signals recorded on the memory module 104, are electrically communicated to each of a plurality of DTMF decoders 160. In the embodiment of FIGS. 1A and 1C, the communication from memory module 104 to DTMF decoders 160 is by wire. In the embodiment shown in FIG. 1C, there are four DTMF decoders 160, one each to determine the presence of a signal corresponding to a command to move in one of four directions, which may be understood as "forward," "backward," "to the right," and "to the left." It is possible that signals for more than one direction can be present at a given time, for example a signal to move forward, and a signal to move to the right, having independent "magnitudes," so as to affect motion in a direction selected within a 90 degree arc. The "magnitudes" can be defined by either or both of an amplitude of a tone signal and a ratio of "on" and "off" durations of the DTMF signal within a time period (i.e., a "duty cycle" of the DTMF signal). Each DTMF decoder 160 is configured to decode only a specific DTMF combination, and to ignore other signals. In response to a DTMF signal specific for a decoder 160, each decoder 160 is activated and trips one or more switches so as to apply electrical signal to motor speed controllers 148, 154, and forward/reverse switches 150, 156, which apply power to driving motors 152, 158 which, respectively, are connected to and which reversibly drive the right tread and the left tread of the robotic apparatus.

Figure 1D:
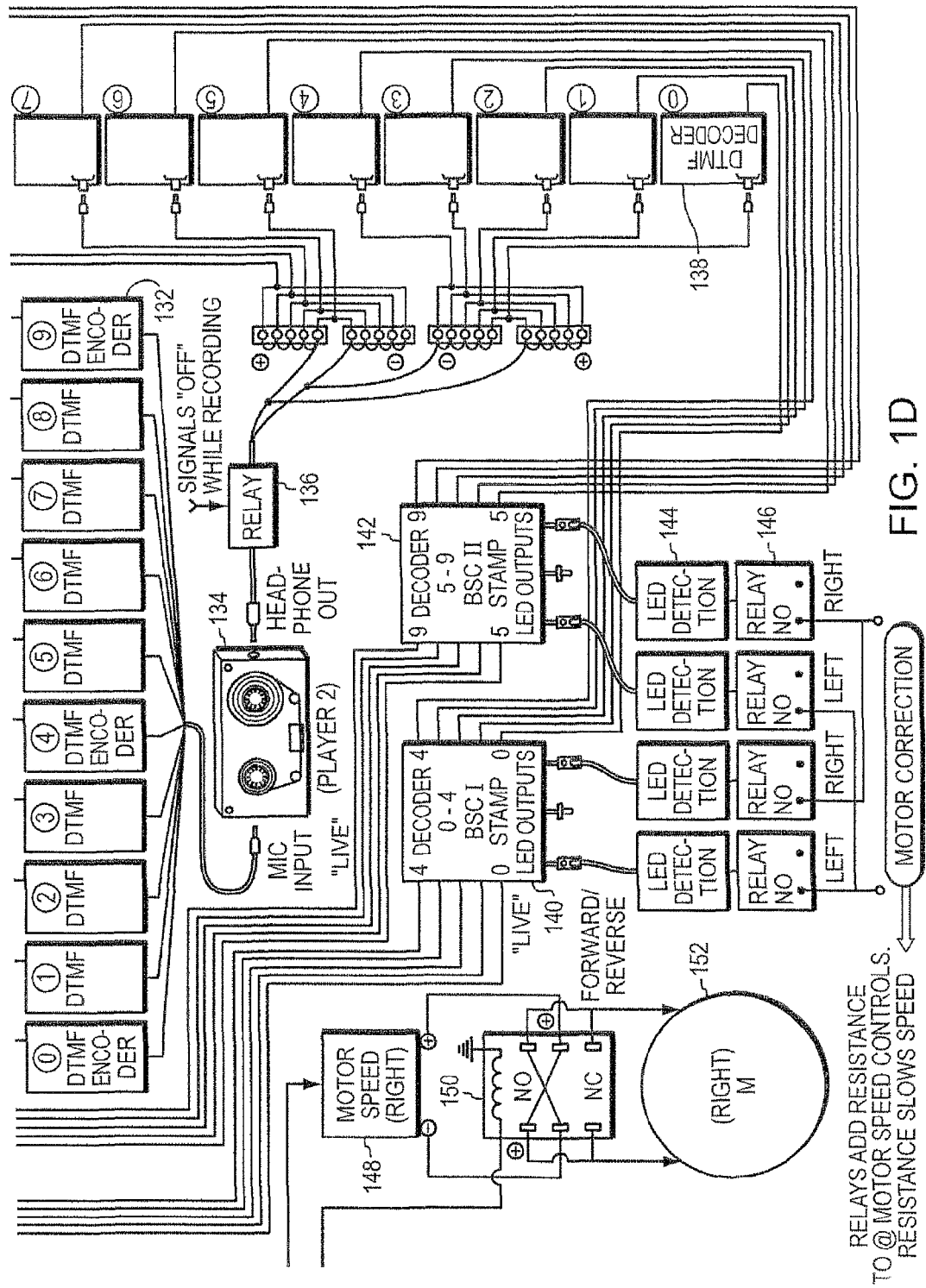

FIG. 1D shows additional portions of the control circuitry of the robotic apparatus. A plurality of DTMF encoders 132 is provided. Each DTMF encoder 132 is electrically connected to a normally closed contact of a respective one of the relays 126. During operation in the "command" mode, when a signal from a selected one of relays 126 is applied to the corresponding DTMF encoder 132, a specific DTMF signal is generated, and is communicated to and recorded by memory module 134 that is configured to store and retrieve information. In the embodiment of FIG. 1D, memory module 134 is a tape recorder that can record the DTMF signals. In other embodiments, the memory module 134 is any device that can store and retrieve information, such as on a floppy disc, a hard disc, a CD-RW disc, RAM, EPROM, EEPROM, and a flash memory. In some embodiments, the memory module 134 and the memory module 104 can be the same memory module.

When the robotic apparatus is in "playback" mode, the relays 126 are respectively connected from their normally open contacts to circuitry that decodes the value of the least significant digit (from "0" to "9") that is being asserted in response to the signal from the compass module 110. The circuitry that decodes the least significant digit value is shown in the embodiment of FIG. 1D as two BSC IC Stamp computers 140, 142 that respectively decode the digits 0-4 and 5-9. In other embodiments, other circuitry, such as a hardwired logic circuit having 10 inputs and binary coded decimal (BCD) output, can be employed.

When the robotic apparatus is in "playback" mode, the memory module 134 "plays back" its information, or otherwise makes the information recorded thereon available for use. The information, including DTMF signals corresponding to previously recorded least significant digit information, is made available to a plurality of DTMF decoders 138. In the embodiment of FIG. 1D, there are 10 DTMF decoders 138, each configured to decode a signal corresponding to a particular value of a least significant digit pre-recorded in the form of a DTMF signal, as explained above. A decoded signal from DTMF decoders 138 is also applied to the decode circuitry 140, 142. In an alternative embodiment, a second hardwired logic circuit having 10 inputs and binary coded decimal (BCD) output receives as input the decoded signals from DTMF decoders 138.

The two sets of signals represent the least significant digit available in "playback" mode, one from the compass module 110, and one from the memory module 134. The two representations of the least significant digit are then compared. The comparison circuitry of the embodiment shown in FIG. 1D is a computer 140, 142. In an alternative embodiment, a hardwired comparator circuit can be used. If the result of the comparison is equality to within a range of tolerance, there is no error and no corrective action is needed. However, if the two signals representing the least significant digit differ by more than the range of tolerance, i.e., if the difference exceeds a predetermined value, then the comparison circuit generates a correction signal depending on whether the recorded least significant digit represents a greater or a lesser angular heading than that represented by the measured orientation from the compass module 110. In this logic, looking at the least significant digit alone, zero is greater than "9" but less than "1," as in 139<140<141, or 359<0<1. If the recorded (i.e., planned) heading is greater than the measured (i.e., current actual) heading, the robotic apparatus is commanded to make a rightward correction, and if the recorded heading is less than the actual heading, the opposite correction is applied. As long as corrective action is taken sufficiently often and the correction is applied promptly, the robotic apparatus will be prevented from deviating far from the desired direction, and will follow the expected path to within a tolerable error.

In the embodiment of FIG. 1D, the result of the comparison by computers 140, 142 appears as a signal that is sent to the motors driving the treads of the robotic apparatus 10, so as to turn the robotic apparatus 10 in the required direction to correct the behavior of the apparatus. One method of applying the corrective action is to slow the motion of the tread on the side to which the turn is to be made relative to the motion of the tread on the opposite side. In other embodiments, the tread on the side opposite to the turning direction is caused to speed up. In yet other embodiments, both corrections are applied together. In some embodiments, causing a tread to slow its motion relative to the other tread can involve reversing the direction of motion of the tread which is to be caused to slow down.

FIG. 1E is an illustrative perspective representation of a robotic apparatus 10, showing a chassis 12 that supports all of the operative mechanisms of the apparatus, including the control system (not shown), the drive motors 152, 158 (shown in phantom), and the treads 180, 182, and that has fittings for attaching thereto one or more tools for performing functions such as grass cutting, vacuuming, snow removal, digging or drilling, or the like, including motors and the like for moving the tools as needed. The tools are not shown. The tools are computer controlled, either by a computer resident in the robotic apparatus, or by a computer provided with the tool that is in communication with the control system of the robotic apparatus.

A "slave" apparatus, as indicated above may lack the remote input device 102, and may comprise a memory module, 104, 134 that employs only pre-recorded media, and that is not capable of recording new information.

FIG. 2 illustrates an exemplary embodiment of an alarm circuit 200. In one embodiment, one or more proximity sensors 202 are located on a bumper that covers the entire perimeter of the covering shroud of the robotic apparatus 10. The purpose of the one or more proximity sensors 202 is to detect objects in a timely fashion as to avoid possible damage to the under carriage, or to the object. Each sensor 202 is wired in parallel, thereby allowing each to trip an alarm circuit in and by itself. When an alarm is activated, the robotic apparatus can be commanded to terminate forward movement, suspend playback, and provide an audible and or visual notification. A manual reset control 222 is provided to deactivate the alarm condition. This prevents continuation of operation until a person intervenes.

The circuit of FIG. 2 includes a switch 204, such as a relay, that receives the alarm signal from the sensor 202. The switch 204 activates a plurality of alarm circuits 206, 208. One alarm circuit 206 activates a switch 220, such as a relay, that stops the "playback" of recorded instructions. Another alarm circuit 208 activates a switch 210 that disables the switch 204, temporarily disconnecting the proximity sensor 202 from the alarm system. Switch 210 also activates switch 212, which can be a relay, that in turn activates a visual signal 214 and an audio enunciator 216. When the reset 222 is activated, all of the switches 204, 210, 212, 220 and the alarm circuits 206, 208 are returned to the state that they had prior to the activation of the proximity sensor. Normally, the robotic apparatus 10 is adjusted, by being moved or by removing the object, before the reset 222 is activated.

The covering shroud comprises a fiberglass body hinged at one end for internal access. Air intakes that provide air to the combustion engine are located on either side of the shroud. The intakes also provide air circulation to cool operating circuits.

A proximity sensor bar detects objects and sends a signal to alarm circuits. A suitable proximity sensor can be constructed using the touch switch kit available from Ramsey Electronics, Inc., 793 Canning Parkway, Victor, N.Y. 14564. Information about the touch switch was available at the time of filing of the application from Ramsey Electronics.

Figure 3A:
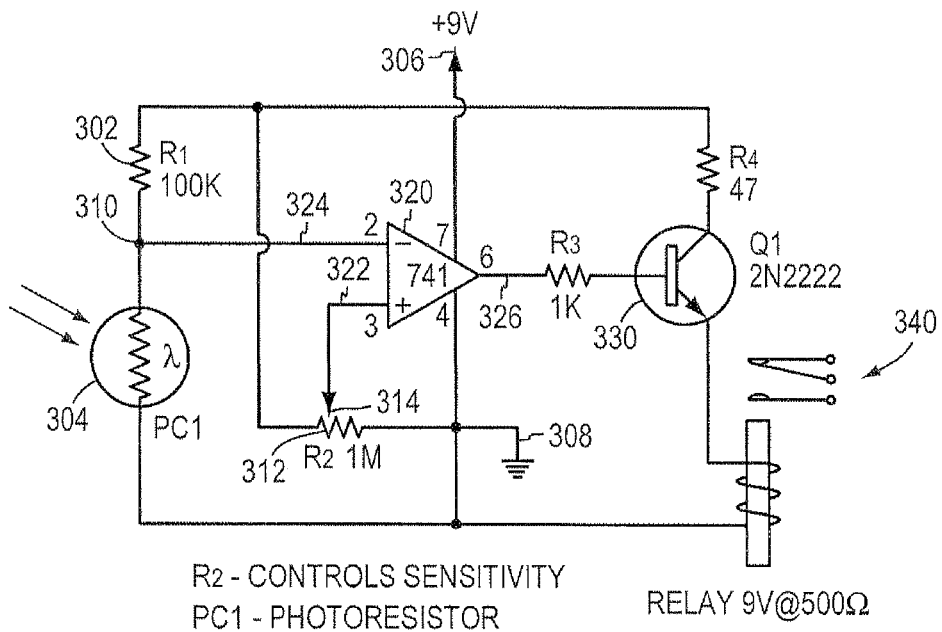
FIG. 3A illustrates a circuit suitable for detection of a signal from a LED, for use according to principles of the invention.
Figure 3B:
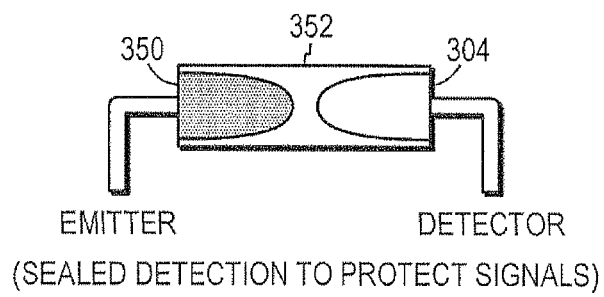
FIG. 3B is a drawing in side section of an LED and an optical detector housed within an opaque containment structure, for use according to principles of the invention.

FIG. 3A illustrates a circuit suitable for detection of a signal from a LED. In FIG. 3A, resistor 302 and photoconductor 304 form a voltage divider between a higher voltage reference 306 (such as +9 Volts) and a lower voltage reference 308 (such as ground potential). In the embodiment of FIG. 3A, the voltage at the node 310 between the resistor 302 and the photoconductor 304 will vary between 0 and 9 volts in proportion to the resistance of the photoconductor to the sum of the resistances of the resistor 302 and the resistance of the photoconductor 304. Since light falling on the photoconductor 304 raises it conductance (i.e., diminishes its resistance) in proportion to the intensity of the light and the number of carriers generated within the photoconductor, higher illumination will reduce the voltage at the node 310. The node 310 is connected to op amp 320 at the negative input terminal 322 thereof.

A variable resistor 312 is connected between voltage references 306 and 308. The variable voltage terminal 314 of variable resistor 312 is connected to the positive input terminal 324 of op amp 320. Reference voltages 306 and 308 also power op amp 320. Op amp 320 provides an output signal at an output terminal 326 thereof. When operated "open loop" as depicted in FIG. 3A, the output signal of op amp 320 is substantially the value of the higher reference voltage (the "positive rail") when the voltage on positive input terminal 322 exceed the voltage on negative input terminal 324. When the voltage on negative input terminal 324 exceeds the voltage on positive input terminal 322, the output signal of op amp 320 is substantially the value of the lower reference voltage (the "negative rail"). The transistor 330 (in the embodiment shown, an NPN 2N2222) turns on when the output of the op amp 320 is at the positive rail, and current flows through the relay 340, activating the relay 340. As will be recognized by those of ordinary skill in the electronic arts, setting the value of the variable resistor 312 as set by contact 314 will determine what level of illumination is needed to activate relay 340.

FIG. 3B is a drawing in side section of an LED and an optical detector housed within an opaque containment structure. In FIG. 3B, the LED 350 is present within housing 352. Photoconductive element 304 is positioned with housing 352 to receive light emitted by LED 350. The housing 352 is opaque in the range of optical signals that activate Photoconductive element 304, so as to eliminate stray radiation that might cause false triggering of photoconductive element 304.

Figure 4:
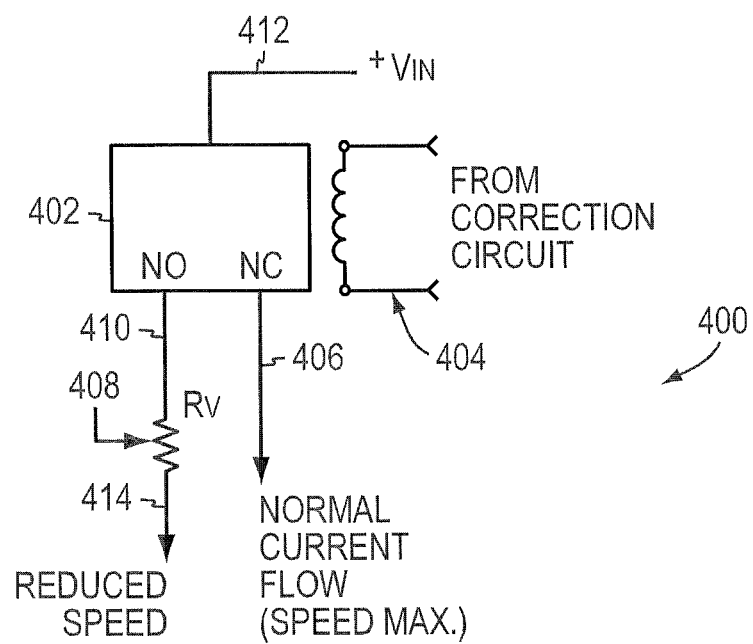
FIG. 4 illustrates an embodiment of a corrective relay circuit, according to principles of the invention.

FIG. 4 illustrates an embodiment of a corrective relay circuit. The circuit 400 of FIG. 4 is used to correct the speed of a motor, such as motors 152, 158. The circuit 400 comprises a relay 402 that can receive a corrective signal, as needed, from a source by way of inputs 404. The relay 402 is connected by way of a normally closed contact 406 to a device to be controlled, such as one of motors 152, 158. The relay 402 has a second connection to one of motors 152, 158 by way of a normally open contact 410 and a variable resistor $R_v$ 408 having an output terminal 414. The relay 402 is powered by connection to power supply $+V_{IN}$, which is connected to input terminal 412 of relay 402. Upon activation of the corrective signal at terminals 404, the normally closed contact opens and the normally open contact closes, thereby providing a reduced current and/or voltage to motor 152 or 158, respectively. The motor is thus caused to reduce its speed, thereby driving its tread at a slower rate. A preferred principle of operation of the DC motor speed control circuit is to vary the amount of time that supply voltage is provided to the motor.

Figure 5:
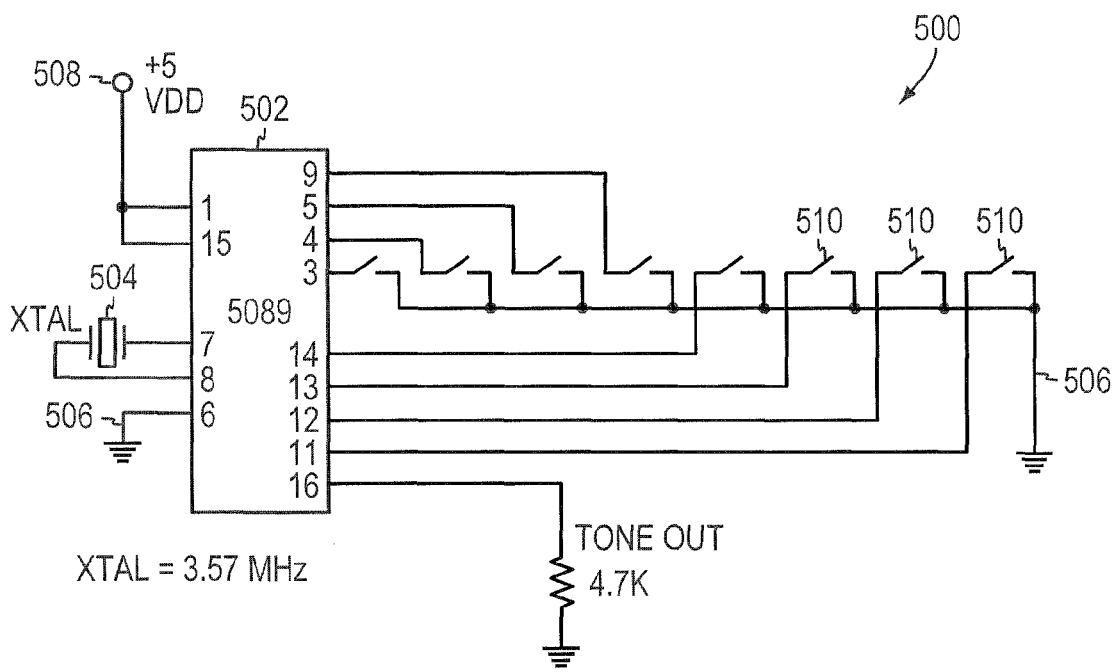
FIG. 5 illustrates an embodiment of a joystick circuit that is useful for providing directives during operation of the robotic apparatus, according to principles of the invention.

FIG. 5 illustrates an embodiment of an input circuit 500 that is useful for providing directives during operation of the robotic apparatus. In one embodiment, a joystick provides the input signals under the control of a user. The following illustrates the schematic layout of the joystick control. The control uses a 5089 DTMF generator chip 502 with a crystal oscillator (xtal) 504 operating at 3.57 MHz. The 5089 DTMF generator chip (or its equivalent) is available from a number of vendors, including for example the TCM5089 from Texas Instruments, Dallas, Tex. Terminal 6 of the DTMF generator chip is connected to ground potential 506. Terminals 1 and 15 of the DTMF generator chip 502 are connected to a positive voltage supply 508, which is some embodiments is +5 Volts. By connecting any of terminals 3, 4, 5, 9, 11, 12, 13, and 14 of DTMF generator chip 502 to ground 506, for example by way of switches 510, a DTMF frequency is generated, and appears at terminal 16 of DTMF generator chip 502. The control can generate 8 distinct frequencies, which can be taken in combinations of two to denote a particular direction (i.e., forward, reverse, right and left). In one embodiment, the frequencies are provided as an electrical signal to the microphone input terminal of a tape recorder for recording. Four switches 510 are implemented within the joystick 102 of FIG. 1A, and by connecting terminals 3, 4, 5, 9, 11, 12, 13, and 14 in pairs to a single switch two tones are generated when any switch in the joystick is caused to close.

Figure 6:
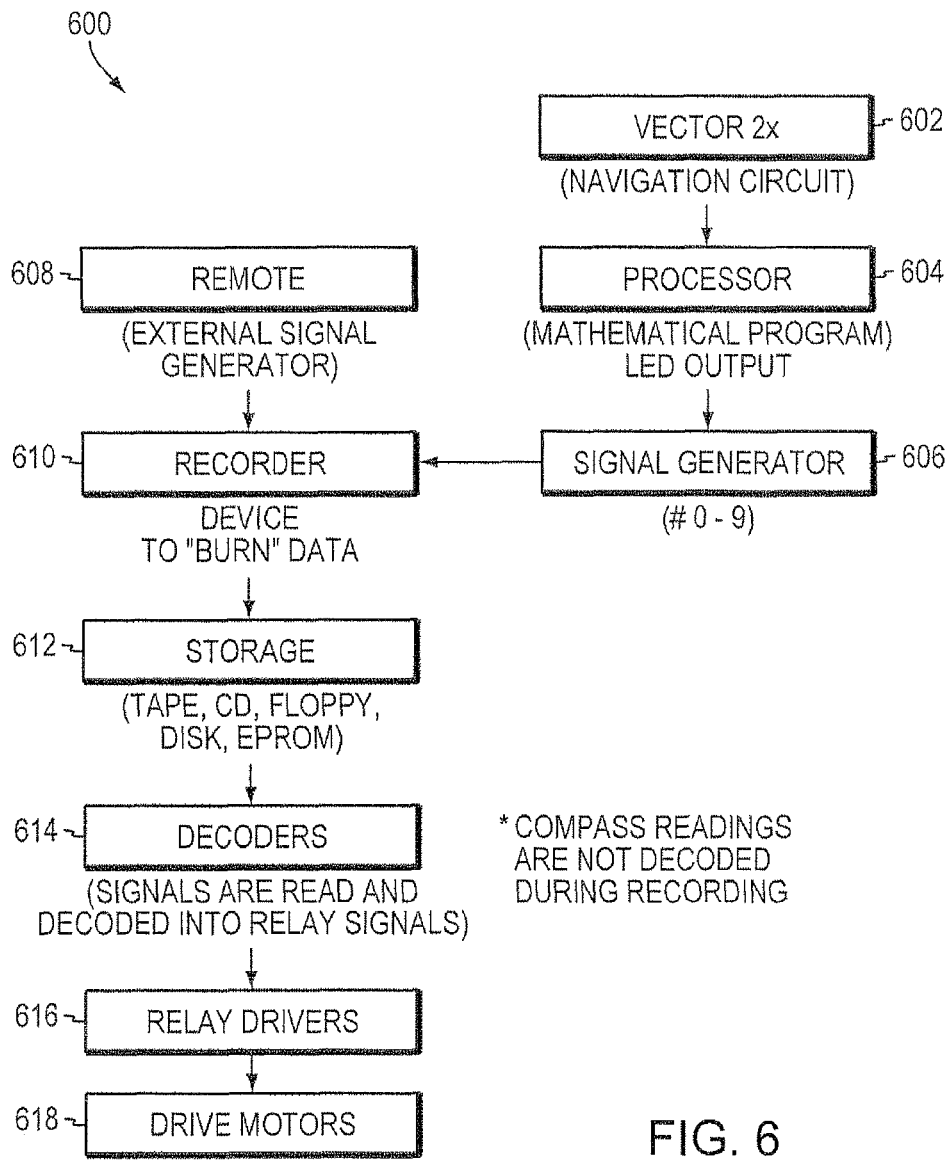
FIG. 6 is a flowchart illustrating a method of providing at least one command recorded on a machine-readable medium, the at least one command representing an instruction for traversing an area of interest, according to principles of the invention.

FIG. 6 is a flowchart 600 illustrating a method of providing at least one command recorded on a machine-readable medium, the at least one command representing an instruction for traversing an area of interest. Each box in flowchart 600 can indicate either or both of a step in a process and a module in a computer program recorded on a machine-readable medium for operation of the programmable robotic apparatus of the invention. As indicated at box 602, a compass, such as the electronic compass 110 described above, takes readings of its own orientation (and thereby, the orientation of the robotic apparatus). In box 604, a computer processor on which the computer program is operating manipulates the raw data from the compass 110 to calculate reading corresponding to a heading, using an orientation receiver module that receives orientation information from the compass module of the programmable robotic apparatus. At box 606, the heading readings are further manipulated to extract control information, such as a least significant digit of a reading. At the same time, the robotic apparatus 10 is being operated by user employing a control apparatus, such as a hand held apparatus like a cell phone, which is an external source of directive for the robotic apparatus, as denoted by box 608. Thus, box 608 will be understood to denote also an instruction receiver module that receives directives from an external source regarding operation of the programmable robotic apparatus.

At box 610, there is denoted a device that records information, including the directives from box 608, and the readings of orientation and headings. This will also be understood to denote a module that controls the recording of information on a machine-readable medium for recovery and use at a later time. At box 612, there is denoted a storage step, which is the step of recording the directives and compass readings (in raw and/or in decoded format) on a recordable machine-readable medium, as described hereinabove.

At box 614, signals including directives and compass readings are decoded as necessary, and are provided to switches that control aspects of the operation of the robotic apparatus. At box 616, the switches (in some embodiments, relays) are activated. At box 618, the robotic apparatus is activated by way of driving motors and the like.

Figure 7:
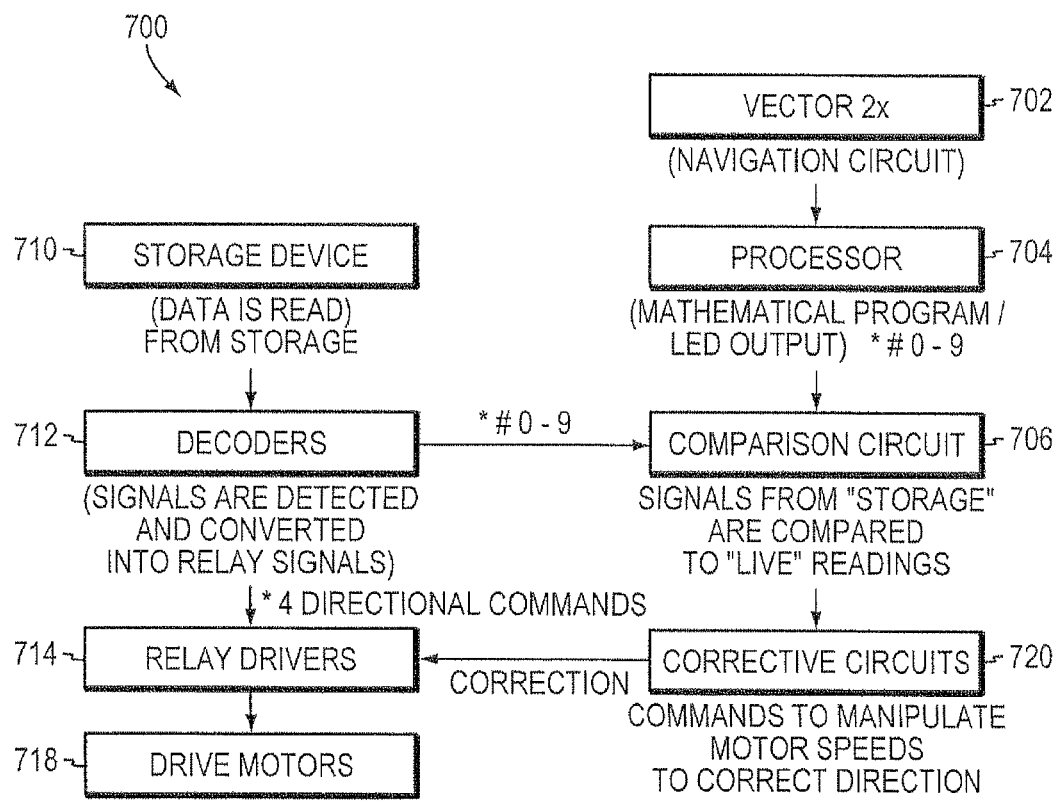
FIG. 7 is a flowchart illustrating a method of operating the robotic apparatus, according to principles of the invention.

FIG. 7 is a flowchart 700 illustrating a method of operating either a master or a slave robotic apparatus autonomously. Each box in flowchart 700 can indicate either or both of a step in a process and a module in a computer program recorded on a machine-readable medium for operation of the programmable robotic apparatus of the invention. While not indicated in flowchart 700 explicitly, as previously described, a user places the robotic apparatus in operating mode. As indicated at box 702, a compass, such as the electronic compass 110 described above, takes readings of its own orientation (and thereby, the orientation of the robotic apparatus). In box 704, a computer processor on which the computer program is operating manipulates the raw data from the compass 110 to calculate reading corresponding to a heading, using an orientation receiver module that receives orientation information from the compass module of the programmable robotic apparatus.

At box 706, the heading readings are compared with information, such as information recorded in prior operation of a master robotic apparatus. This information is made available by way of a machine-readable medium in a storage device, as denoted by box 710. At box 712, the stored information is decoded as needed, and is supplied both to the comparison circuit at box 706, and to switches, such as relays, as indicated at box 714 to operate the apparatus. Thus, box 706 will be understood to denote also a computation module that computes an error signal based at least in part on orientation information from the compass module and information recorded on the machine-readable medium. Box 706 can compute whether there has been an error in the operation of the robotic apparatus 10, by comparing the actual orientation signals and the expected (i.e., previously recorded) orientation signals and directives to look for discrepancies. Box 706 will also be understood to denote an error correction module that, in the event that the error signal exceeds a predetermined value, computes an error correction to be provided as a corrective action command to the programmable robotic apparatus. Box 706 can thus send corrective information to box 720.

At box 720, there is denoted a device that issues commands including correction signals to control the robotic apparatus 10 to take corrective actions. At box 714, signals including operational signals and corrective signals, as required, are provided to switches such as relays that control aspects of the operation of the robotic apparatus. At box 718, the switches (in some embodiments, relays) are activated. At box 718, the robotic apparatus is activated by way of driving motors and the like. The computers that control both master robotic apparatus and slave robotic apparatus include a supervisory module that controls the autonomous operation of a programmable robotic apparatus and that, as required, receives information recorded on a machine-readable medium. When the robotic apparatus has completed its programmed activities, it is turned off, either by an explicit instruction in the computer program, or by the intervention of the user.

In an exemplary embodiment, the robotic apparatus is a modified 20" mowing chassis containing twin electric motors adjacent from one another providing mobility. Each motor is bolted to the frame with sliding mounting brackets to aid in chain tension. From each of the motors, reduction gears are connected to chain assembly, which transfers power down to a sprocket mounted drive wheel. These rotations are counted as electrical pulses and stored for later distance measurements. Maintaining distances ensures the machine does not wander without detection. Rubber tracks are there powered to provide for smooth mobility over diverse terrain. Tension is applied to the tracks with the aid of tension bars, which contain adjustable springs delivered by stainless steel wheels. By applying pressure on the bars in the opposite direction, tension is removed momentarily from the belt thereby allowing for replacement.

In the exemplary embodiment, power is generated by the use of an alternator from which it derives its power by the rotating vertical shaft controlled by a gasoline engine. The AC generated by the alternator is then converted to DC with the aid of a conversion circuit. The electricity is then sent to a central panel where it sources out its DC power to the remaining circuits. A battery stores the remainder of unused electricity for later recall.

In this exemplary embodiment, the vertical shaft powered by the gasoline engine is monitored for strain or an increase in load by a current monitoring circuit. As a load increases, current follows in direct proportion. This detection serves as a monitor for cutting tall grass and prevents the engine form stalling out under duress. Should the current increase sufficiently enough to be detected, an additional circuit will be employed to slow the forward progress and if necessary, stop and reverse before continuing.

In this exemplary embodiment, each drive motor is controlled by a variable speed limiting circuit, which determines their revolutions per minute. Resistance added within this circuit reduces the amount of current fed to the motors, ultimately slowing revolutions for slight directional tuning. Each circuit also has the ability through relays, to switch rotational directions for forward and reverse commands.

In one exemplary embodiment, to begin programming the system, a user designates a starting location. Once an area has been selected, four hollow spikes or tubes are then introduced into the earth to be made flush with the surface. This is achieved by applying slight pressure with ones foot in order to set the spikes. In areas where the earth's density is greater than tapping with the aid of a hammer may be used. A set of guides allow for an accurate placement, as they need to be aligned with the machine. Once the hollow spikes or tubes are made flush, the machine is then placed over the configuration and aligned with placement rods. A rod is placed in each of the four corners of the chassis, allowing for an accurate initial alignment. A consistent starting location is useful to the machines playback operation.

In one exemplary embodiment, a joystick is used to control four commands during programming, forward, left, right, and reverse. Each command is selected by positioning the controller in the four directions. In other embodiments, a hand held transmitting device, such as a cellular telephone, can be used to provide commands. The command generates a unique frequency corresponding with each command. The data is then entered into a recording device through a microphone input and is stored on magnetic tape. Data is simultaneously fed out through the output of he tape player into a series of frequency decoders. These decoders look for unique signatures responsible for controlling the drive motors. This gives immediate feedback to the programmer by viewing the movement behavior of the machine.

A digital compass module, the Vector2x, will enhance the programming data by providing raw measurements to correspond with command inputs. The compass is read by a stamp circuit, which provides for a numeric output. The data is then fed to an adjoining stamp circuit where it is broken into ten possible combinations. Each is represented with a light emitting diode that signals its presence by illuminating. The illumination is detected by light sensitive circuits, which then activate specific relays. These relay control frequency encoders that generate a signal to represent each of the ten possible data outputs. The signals are then fed through a microphone input into a magnetic tape recorder for storage.

In one exemplary embodiment, the programmer overlaps the cutting of the grass by ⅓ the width of the lawn mower. This safeguards any slight changes throughout the entire playback procedures and offers a margin of error.

In the exemplary embodiment described, upon playback, the digital compass serves as a live reading from which recorded data is then compared to. There unique frequencies are detected and their corresponding relays are activated. The electrical signals provided from the decoders are sent to two processors for comparison to those provided from the compass. The two sets of signals representing compass readings are then compared for analysis. This step determines whether the machine is in one of three possible states. They include 1 degree right, 1 degree left and or, center. Of these three states, only the first two signify a need for correction. The processors indicate the status of the three states and output a corresponding signal by activating a light emitting diode.

In the exemplary embodiment, when the diode representing left is activated, a light sensitive circuit senses its presence and triggers a relay. This relay sends a signal to the right side drive motor control where, it increases electrical resistance thereby slowing the motor in direct proportion. When the correction is complete, electrical resistance in the motor controls is returned back to its normal state. This allows the machine to correct its heading slightly to the right, returning back onto its intended course while in forward motion.

In the exemplary embodiment, when the center position is activated, there are no commands being sent to the drive motor control's as there in no correction needed. The diode representing the center position is primarily used to allow a user to calibrate the system.

In the exemplary embodiment, when the diode representing right is activated, a light sensitive circuit senses its presence and triggers a relay. This relay sends a signal to the left side drive motor control where, it increases electrical resistance thereby slowing the motor in direct proportion. When the correction is complete, electrical resistance in the motor controls is returned to its normal state. This allows the machine to correct its heading slightly to the left, returning back onto its intended course while in forward motion.

In one embodiment, each electrical circuit and/or device that can generate electrical fields or that can be affected by electrical fields, can be enclosed, or "wrapped" with a grounded shield mesh (i.e., a Faraday cage) to prevent interference between components.

In another embodiment, for example for use in a "surveillance" mode or "night watchman" mode of operation, the robotic apparatus can have a plurality of sets of instructions pre-recorded, each set of instructions corresponding to one of a plurality of paths traversing an area of interest. One of the pre-recorded sets of instructions can be selected for use in any particular traverse of the area of interest, so that the robotic apparatus behaves in a manner that is not predictable with certainty by a disinterested observer. For example, the selection of a particular set of instructions can be based on a random number generator that can be programmed as a random number generator module in the computer program recorded on a machine-readable medium. The selection can in different embodiments be made by the robotic apparatus itself, or by an external actor, such as a user, or a computer program under the control of a user. The robotic apparatus can use tools such as an electronic camera, a video camera, a radio, a chemical sensor, a biological sensor and the like to detect and to report a condition that deviates from a predefined base condition.

Additional Embodiments

Non-GPS Methods for Robotic Navigation

The programmable robotic apparatus is configured to receive "environmental signals" of terrestrial origin, which are understood generally as any artificial signal that is provided for purposes other than for the demarcation of a particular area or path of interest, and that is exploited by a robotic apparatus for traversing an area or a path of interest. This system relies principally upon terrestrial signals such as radio, cellular telephone and television broadcast signals that provide the synchronization required for positional triangulation. The "environmental signals" are detected by a respective environmental signal detector module, such as a cellular telephone signal detector, radio signal detector, and a television signal detector.

Unlike GPS which relies principally upon non-terrestrial signals transmitted from distances of thousands of miles from satellites in space (e.g., in earth orbit), the origin of terrestrial signals is expected to in general be much closer to the programmable robotic apparatus (e.g., typically within tens of miles or less). This close proximity greatly improves the reliability and reduces environmental signal deterioration. An array of environmental sensors can provide information about environmental weather conditions, such as moisture, that could otherwise distort signal reliability through prediction and neural learning software processes. This approach provides a very practical solution for a new generation of terrestrial navigational aids.

Manufacturers of autonomous robotic systems are trying to create improved navigational aids that allow their machines to traverse a path or an area without human intervention. The autonomous robotic system needs to be capable of identifying its current location in order to accurately traverse to an intended destination. Position locating is based in part upon the ability of an autonomous robotic system to interpret the data received from its sensors and applying that data to making intelligent decisions. Often the data is inaccurate or is limited in its availability. The lack of accurate information can lead to errors in navigation.

Errors in data interpretation can be caused from a variety of sources. Most often it is the data itself, which has become corrupted that leads to computational errors. We examine the possible causes of data corruption in order to isolate their effects and to account for them.

In order to reduce navigational errors, we look towards limiting environmental conditions that are expected to work against us. For example, limiting the distance between a transmission source and a receiver can limit the obstacles that can lead to a reduction in signal quality while also enhancing signal strength.

Signals of terrestrial origin include sources such as radio signals, television broadcast signals, cellular telephone signals and wireless network signals normally used for the purposes of communication. In the applications contemplated herein, such signals are used to provide time components that can be correlated with measurable distances and used for the purposes of navigation. These data can be used to provide methods to calculate a distance between a source and a receiver. The new digital signal sources available to us can be usefully employed in this type of navigation.

In the prior art, these transmissions have often been provided as unsynchronized signals. In such cases, there is no basis for making accurate time and distance measurements. The availability of high quality digital transmission formats provides an opportunity to employ communication towers for the purposes of navigation.

In some embodiments, advantages of signals of terrestrial origin over non-terrestrial sources such as GPS include a reduction in propagation distances, an increase in signal strength, reduction of intervening atmospheric conditions, and elimination of motion of the signal source, such as positional changes in orbit.

Navigating a Robotic Apparatus

One approach to utilizing these environmental signals is through a process of time differentiation. When an incoming signal, such as that from a HD radio signal is received, a time differential can be calculated between the time a signal is transmitted and when it is received. This differential reveals a distance measurable component by multiplying the time of travel by the known speed of travel of electromagnetic waves e.g., approximately 186,000 miles per second, the speed at which radio waves travel in free space. Comparisons of three or more radio sources can provide enough data to perform triangulation.

Triangulation is an accurate method of determining a fixed location. An immediate recognizable advantage over non-terrestrial transmitters, such as GPS, is the fixed locations of local signal sources, such as broadcast towers. Signals broadcast by stationary transmitters eliminate issues related to positional changes or constant motion of a transmitter. Signals of terrestrial origin are becoming quite abundant as more systems that rely on digital communications come into general use.

Signal Origins

On Oct. 10, 2002 the Federal Communications Commission (or "FCC"), approved a digital band to be used for commercial digital broadcasts. The developer of HD radio, Ibiquity, was granted permission to broadcast their digital IBOC, or In-Band-On-Channel technology for both AM and FM radio. The development of digital broadcasts makes available one source of components that can be used for programmable robotic technology.

HD Radio Signals

Currently there are hundreds of radio stations that have applied HD radio broadcast technology. AM HD radio transmits between 540 KHz-1.6 MHz, while FM HD radio broadcasts can be found between 88-108 MHz.

HD Television Broadcast Signals

Today there are approximately 800 television broadcast stations transmitting HD digital signals and more are coming online each year. There are three frequency ranges that make up local television broadcasts and they include; 54-88 MHz, (channels 2-6), 174-216 MHz, (channels 7-13) and, 470-890 MHz, (channels 14-83).

Digital Cellular Communications

Cellular communication towers are becoming ubiquitous and are available in large numbers. A restricted radiated output, or operating range, increases the number of overall towers required for uninterrupted service. The frequencies for which the towers operate fall between 824 MHz.-894 MHz, although the transmission frequency range is not continuous.

Communication between a tower and a cell phone occurs automatically upon powering the phone hardware. This is evident by the display of reception bars that are commonly located on the display of a typical cellular telephone instrument. This two-way communication occurs even with the lack of a service agreement, which prevents a user from conducting a conversation other than for 911 type emergencies. Although coded, the phone hardware allows for passive communication that enables the use of time measurable components.

Wireless Local Access Networks

The primary use of wireless local access networks is for the purpose of communication. However alternative components also do exist. Local access networks can also provide time measurable components capable of providing navigation aids. Although somewhat limited in range, they can still provide a useful service other than for which they were initially designed. A grouping of three or more of them can provide the necessary data to perform triangulation.

Signal Propagation Issues

Electromagnetic waves are subject to attenuation, or a signal reduction, depending on the medium through which they travel. These effects can vary in degree depending upon the type of medium and/or environmental conditions. Possible sources of attenuation include water vapor and/or physical obstructions both natural and man-made.

Water can take many forms such as vapor, rain, snow, hail and/or fog. The degree to which atmospheric water content affects radio signals is dependant upon the quantity of water present, and in general, the greater the quantity the higher the attenuation. In general, rain has the most impact upon signals as it contains a greater volume than that of snow, hail and or fog. Although snow may appear larger at times, it is not the size that determines the effect but rather the quantity of water present.

It is also important to consider the effects of attenuation upon the varying lengths of radio waves. Electromagnetic waves obey the relation $\lambda=c/v$, where $\lambda$=wavelength, c=speed of light, and v=frequency, e.g., frequency and wavelength are inversely related. For shorter wavelengths (and higher frequencies), attenuation factors become more prevalent.

One should also consider the structure of Earth's atmosphere. The troposphere, in which virtually all weather phenomena occur, encompasses much of our attenuation effects upon radio propagation. It extends to 3.7 miles at the North and South Pole, and 11.2 miles at the equator. The Stratosphere, which is found between the troposphere and the ionosphere, has virtually no effect upon propagation because of its lack of water vapor and environmental change. Beginning at approximately 31.1 miles above the Earths surface and extending to about 250 miles, the ionosphere has a profound effect upon long distance communications. It contains electrically charged ionic layers that make possible for signals to extend their ranges because of the reflective properties of the ionic layers. These properties however are more prevalent after nightfall.

Figure 8:
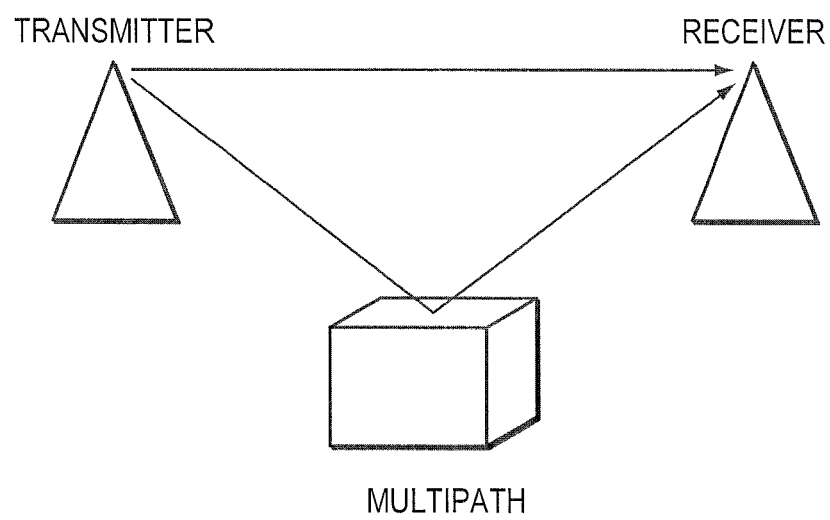
FIG. 8 is a schematic diagram illustrating an example of multipathing.

Other related factors cover physical obstructions, such as mountains, trees and or man-made structures. In the case of mountains, signals can shadow areas situated on the side opposite from the signal source. In some instances, the topography of terrain can cause a reduction of signal power. Typically, the greater the conductivity of the earth's surface, the less the attenuation effects. Trees or foliage can pose an interesting challenge as they tend to be vulnerable to position change caused from wind. Their movement can have varying effects upon signal transmission as well as the density of the foliage itself that may cause scattering. Man-made structures present multiple opportunities for attenuation factors, some of which may include multipathing, reflections, scattering and absorption. FIG. 8 is a schematic diagram illustrating an example of multipathing.

Controlling the effects of signal attenuation may rely on the whether the nature of the dirsturbance is predictable. Man-made structures such as buildings can be plotted to reveal expectations for signal propoagation effects, and some of their effects can be measured.

In the search for a reduction in signal attenuation, we first examine the simplest explanations. Limiting physical and geographical obstructions is a good place to start. Of course a reduction in distances between antennas can often achieve the same result while also enhancing signal strength. These steps most often work however occasionally there are instances where more is required. In this case one may consider employing methods such as prediction through repeatability. It has long been accepted that environmental attenuation is far too complex to solve or even control.

There is a lack of uniformity when it comes to environmental conditions. In general, it is unlikely that there are two areas that is expected to be similar enough to predict results. Instead we employ a system of environmental adaptation through repeatability. We begin with base line expectations for environmental conditions. Our results improve with repeated visits within an area of interest by recording the results for later consideration. The environmental adaptation is for the most part site dependant. In general, a new platform is capable of base line values and is expected to be required to learn from repeated operation. Each time the apparatus traverses the area; it attempts to predict signal attenuation and compensates for any distortion.

Arrays of sensors begin by interpreting the environmental conditions. The results from sensors such as humidity, barometric pressure, temperature, moisture and solar radiation, to name a few, are then assigned numeric values. They become assigned weights for the individual neural nodes within a network. This relationship can be best be described simply as $Y=F(X)$, where X represents an Input and $F(X)$ describes the mathematical relationship that produces the Output Y. Based upon their values, weights can either enhance or reduce the neural nodes outputs thereby affecting their outcome.

Figure 9:
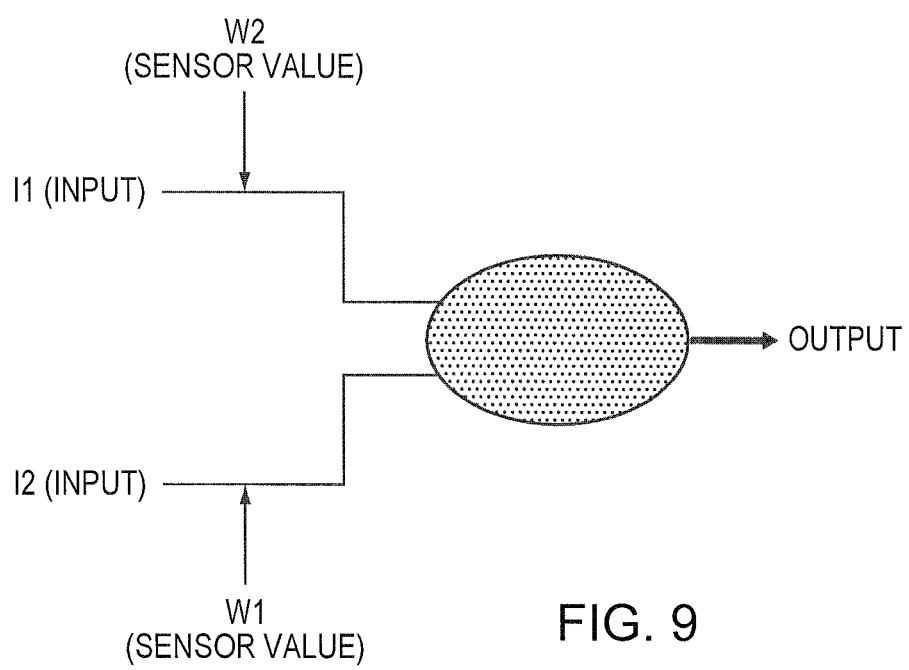
FIG. 9 is a diagram Illustrating a simple neural node.

The decisions from the sensor network is expected to directly effect how the apparatus interprets its received radio signals. The effects upon the neural output is expected to be in proportion to the changes in environmental conditions and prerecorded referenced data. The constant considerations of previous environmental data is expected to allow for an ever changing output response. FIG. 9 is a diagram illustrating a simple neural node and a process involving a neural node. The output from each neural node is expected to involve correlation between prerecorded data and current data. In the absence of such information, radio signals may become distorted and possibly unreadable, rendering them useless.

To create some uniformity, each robotic apparatus contains base line values for varying environmental conditions. With repeated exposure to familiar areas, the robot is expected to adapt to possible signal distortions through associative memory and prediction. It has been shown that signal errors can be reduced through repeated exposures to similar conditions. Unfortunately these error reductions are site dependant and require each apparatus to learn from its own environment. The apparatus becomes "smarter" with added operational experience.

Environmental Signal/Sensor Processing Techniques

Radio frequency interference has long since been known to be a factor in transmission quality. Such interferences have been known to be derived from such sources as sun spots, terrestrial geography and topography, and environmental anomalies such as lightning.

In receiving RF signals from distant towers it is expected that one can have a multitude of obstructions from the environment between transmitter and receiver, such as hills and or buildings. Such obstructions could create multipath fading. This is the result of radio signals reaching the receiving antenna by two or more paths which confuses a receiver and generates noise. Additional causes may include atmospheric ducting, ionospheric reflection and refraction, and reflection from terrestrial objects.

Currently techniques used for the purpose of combating multipath fading include the use of rake receivers. This receiver is designed to counter the effects of multipath fading by using several sub-receivers each delayed slightly in order to tune in to the individual multipath components. Another technique employs a signal-to-noise ratio method (SNR), whereas the power ratio between a signal and background noise are examined.

An additional method for examining environmental signals involves the use of neural network software/hardware. By employing an array of environmental sensors such as heat, moisture/humidity and or light sensors among many, ($\Delta x \approx \Delta Y$), data can be introduced into a processor and analyzed for a case by case study of the current environment, using a relationship $Y=F(X)$ (see FIG. 10). This analysis is expected to then be fed into a central analysis circuitry where it becomes a component of the live readings used for course determination by influencing the effects of environmental conditions on environmental signal reception.

Such neural software has the ability to learn from its environment and may be continually reconfigure its data to best suit the environment and its current conditions. Understanding the environmental conditions is expected to allow our network to best analyze the input or sensory data from environmental signals; i.e., man made structures may be present on a multitude of passes but weather conditions constantly change. Additional anomalies such as CB radios and non-conforming transmitting towers could also interfere occasionally and are expected to need to be examined on a case by case study. The introduction of neural processes could reduce the effect of environmental anomalies by understanding that in fact they do not belong.

Algorithms
Social Proximity

Machines using unique identifiers signifying their identity can be tracked individually within close proximity from one another. Each signal is expected to be recognized and plotted in order to prevent multiple platforms from transversing the same area of interest. An apparatus can be sent orientation data as they relate to other machines and therefore could prevent a multiple transverse of an area or it could activate specific sensors to look for other machines. If one machine does not answer a request to "move", then the machine communicating is expected to prevent collision.

Environmental Observation

An apparatus could look for changes in environmental readings previously programmed as base readings. They could also act independently from set programs by the use of environmental sensors inputting analog signals pertaining to the environment. Such sensors could include, rain sensors, heat, smoke, biological, touch/pressure, etc. These sensors are expected to play a significant role in understanding its environment through sensory input. These base readings are expected to be used to alter the effects of environmental signals to adjust for any interference.

Self-Preservation

This algorithm is expected to examine data from sensory inputs, such as those from environmental programs, whereas it is expected to determine whether there is a threat. Data from diagnostic programs is expected to also send data here for calculation and assessment. This algorithm is expected to make a determination and transmit an action pulse to output controls such as drive train motors, giving a command to reverse and or stop. These evasive maneuvers are not held to reversing and or stopping but should be represented by any action other than a preprogrammed directive.

Diagnostic

This algorithm is expected to examine signals from both mechanical/electrical systems. If electrical pathways or circuits become damaged, sensors are expected to detect the break or malfunction and are expected to look to correct and possibly reroute signals to a back up system. This could be achieved by having a series of "common" pathways. This allows for multiple signaling along the same pathway. Mechanical failures are detected when an output signal is received and yet there are no responses. For an example if a command is sent to the motor outputs to transverse forward, wheel rotations, compass, and other navigational instruments should be detecting a change in position. If a change is not detected or wheel rotations have not begun, then there is expected to be a failure detected. The diagnostic program is expected to have "override" power to control circuits to enable safety methods.

Operational Redirection

This allows for a user to call out a new coordinates to the apparatus to transverse an additional area of interest. This is expected to allow a user to reprogram for newly planted shrubs, trees, and or any other obstruction without total reprogramming. The program is expected to override preprogrammed commands and allow for input of new instructions. Another redirection purpose is expected to be for security applications where a programmer could send out a new coordinates for investigation. Either by a user and or automatic alarm response triggered by alarm sensors, the apparatus could investigate the area and return later to the original point of redirection.

Communication

This algorithm examines the communications between multiple machines and or base stations. When a transmission signal is being sent it is expected to look for a receiving signal that is returned giving notification of a successful transmission. Should there be no receiving signal, it is expected to look to correct the problem through diagnostics. It could either be the transmitter and or receiver that might have failed to operate. Each transmitter has a unique identifier from which can give individual identification. This program is linked to self-preservation.

Tool Function

This algorithm is expected to monitor tool functions and the commands that control them. Here a command signal is given and a response is expected. If after a command there are no proper functions detected, then the program is expected to look to perform diagnostics.

Orientation/Navigation

This algorithm is expected to examine the operations of sensors responsible for navigation. Signals from these sensors are expected to be monitored for both overall operation and resulting outputs. A comparison of the navigational signals and, actual environmental sensors, is expected to indicate proximity to objects and platform movements.

Communication between algorithms is essential to proper operation. Each has specific operations to perform. Having sensory data sent to a common pathway is expected to allow all algorithms to seek for specific bits at the same time. This is expected to speed up the transfer of information by parallel means rather than series decisions. Each neuron of the human brain is connected to at least 1,000 others and as many as 10,000. The transmission speed between them is 200 mph. Though this is slow compared to computer transfer speeds, it is the magnitude of the connections that make up for the speed. This is the model for our neural networks. The multiple connections within common pathways with specific neurons assigned specific algorithms.

We can use neural networks for learning or adaptation. This allows the system to constantly adapt to a series of changes, allowing for a memory to be rewritten over time ("adjusted memory"). Information collected during operation is expected to be mixed with old data and a new memory entry is expected to be produced with a new or updated signals. Former output results might be compared to current analysis in order to assist in making a decision. Similar bits from previous actions could be collected and mixed with current bits to make an intelligent calculation. This is expected to allow for an environmental change that effects a signal reception and over time the memory accounts for this change. The important factor is that the memory change happens over time and not with a single detection thereby looking for a permanent pattern change in the environment.

The systems and methods of the invention can also use a learning algorithm. Learning algorithms are those that are modified during use by applying information collected during operation to existing data or information. The algorithm is modified to produce with a new or updated method, that provides an improved output. In some embodiment, old results are compared to current analysis in order to assist in making a decision how to update parameters in the algorithm, for example coefficients in a fitting equation.

Extremely Accurate Tool Operation

Elaborating more on the concept of master/slave relationships, to allow for a more accurate information transfer of human movements. A user might employ a robotic exoskeleton to different parts of his/her body to digitize the actual movements. The exoskeleton may require the same tooling as the slave unit in order to better control exact behaviors. The exoskeleton is expected to convert movements into digital signals for both recording and transmitting to a slave unit and or other host. Upon receiving the digital signals, the slave unit is expected to mimic the exact movements of the original user. This provides for a faster programming capability of complex mechanical movements that is expected to otherwise take enormous programming code. Users could purchase a slave robot with no programs and later purchase the software for specific job functions. i.e., dishwashing, planting, picking fruit, general cleaning, etc. A user is expected to purchase a dishwashing program, bring it home and upload the program into the slave. Programs could consist of a single action and or multiple repetitive actions that combine for intelligent recognition, i.e., a dishwashing program might have 50 different washes stored. Each wash cycle has different types and sizes of dishes and each uses different washing methods. Upon reading the multiple programs, it either choose an exact program or simulate a new program by combining various bytes of data from each program to match current conditions.

Operating Procedures

Recording Procedure

The following steps provide information and instructions to be recorded on machine readable medium:
An external control device inputs command directives;
A compass module provides orientation data;
A command receiver module receives orientation data;
Environmental signal detection modules receive terrestrial communication signals used for communication, to discern at least in part orientation data, Playback #1:
Data is read from the memory modules which provide;
Command directives;
Compass orientation readings;
Command receiver orientation readings;
Environmental signal readings;
To be introduced into a computational module and compared with current or "live" readings to discern an error value;
Whereas said error value is sent to a control module for orientation manipulation.

Figure 10:
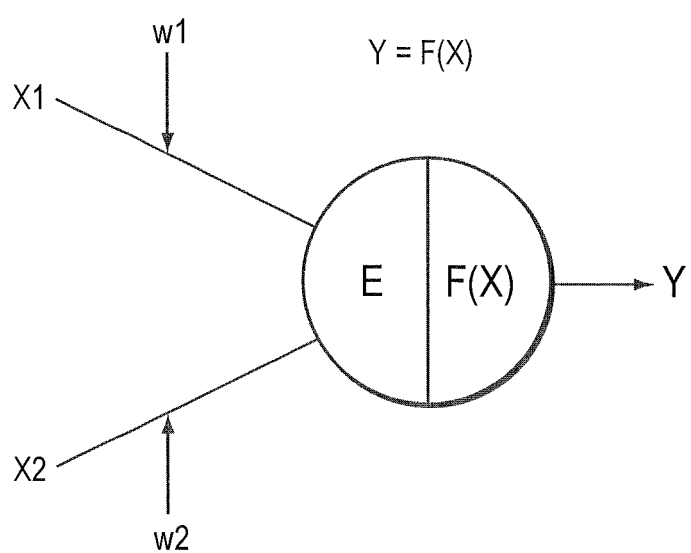
FIG. 10 is a schematic diagram that illustrates a neural network system that deduces a relationship Y=F(X), according to principles of the invention.

Playback #2:
Data is read from the memory modules which provide;
Command directives;
Compass orientation readings;
Command receiver orientation readings;
Environmental signal readings;
To be introduced into a computational module and compared with current or "live" readings to discern an error value;
Said error value to be compared to previous error values within a computational module to derive final error value;
Said error value is then sent to a control module for orientation manipulation.
Playback #2 procedures are repeated thereafter FIG. 10 is a schematic diagram that illustrates a neural network system that deduces a relationship $Y=F(X)$, where X represents Inputs (Environmental signals), W represents weight factors (Environmental sensors), $\Sigma$ is Summation process, $F(X)$ represents a factor of X, and Y is the Output (Error signal).

This represents the method for which Environmental conditions are expected to affect the output of navigational commands regarding course corrections. Environmental sensors are expected to be fed into the computational process at points of W1 & W2. These weights are expected to inhibit, remain neutral, and or amplify the input values of Environmental signals. This is expected to allow for adjustments in weather conditions.

This method is expected to allow environment weather conditions to affect directly the output of environmental signals, thereby adjusting for change and avoid program confusion. Over time, weather and or environmental sensor data is expected to be capable of predicting signal behavior by comparing stored data with similar results.

Figure 11:
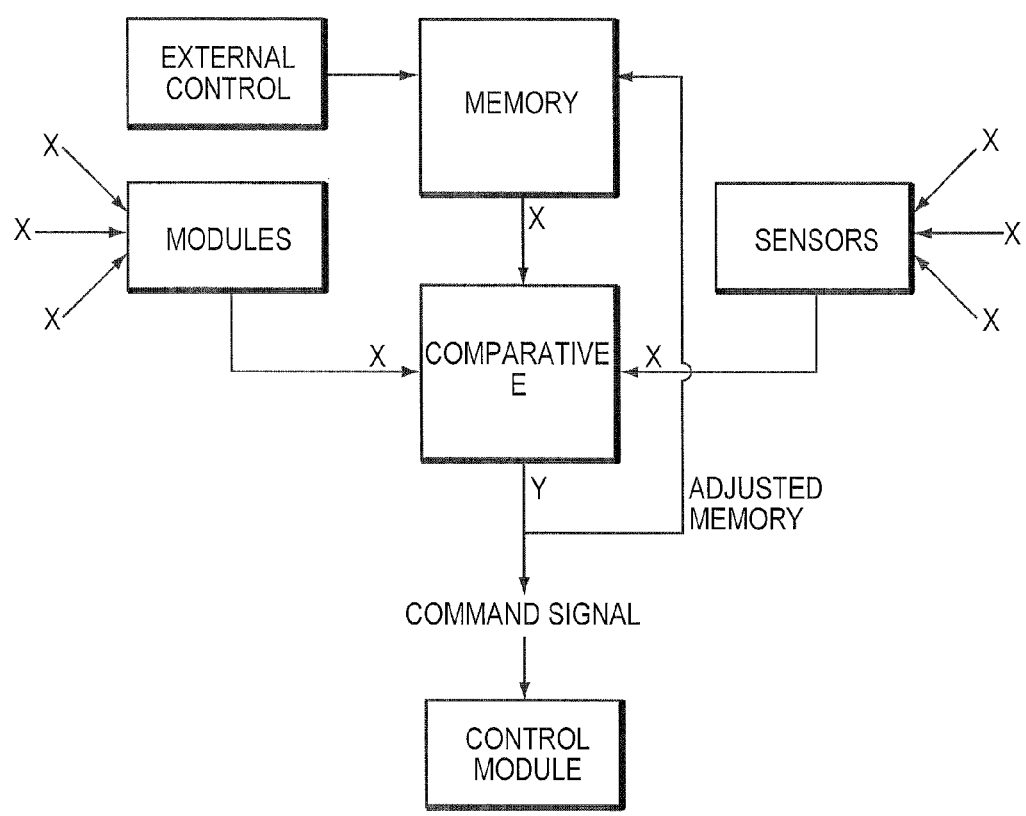
FIG. 11 is a schematic diagram illustrating one system architecture embodiment, according to principles of the invention.

FIG. 11 is a schematic diagram illustrating one system architecture embodiment. The comparative block E compares new data (i.e., real time data) from sensors and modules with data in a memory. In situations where the new data is consistent and repeatable but different from the information in memory, the memory can be updated to account for the new data.

Figure 12:
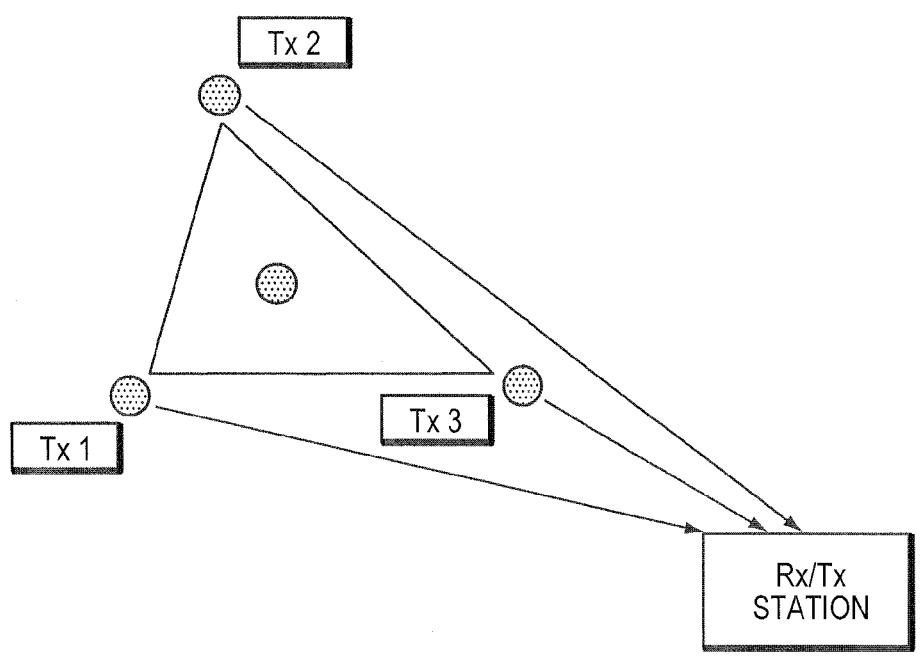
FIG. 12 is a schematic diagram that shows a device with a plurality of transmitting antennas in a known configuration.
Figure 14:
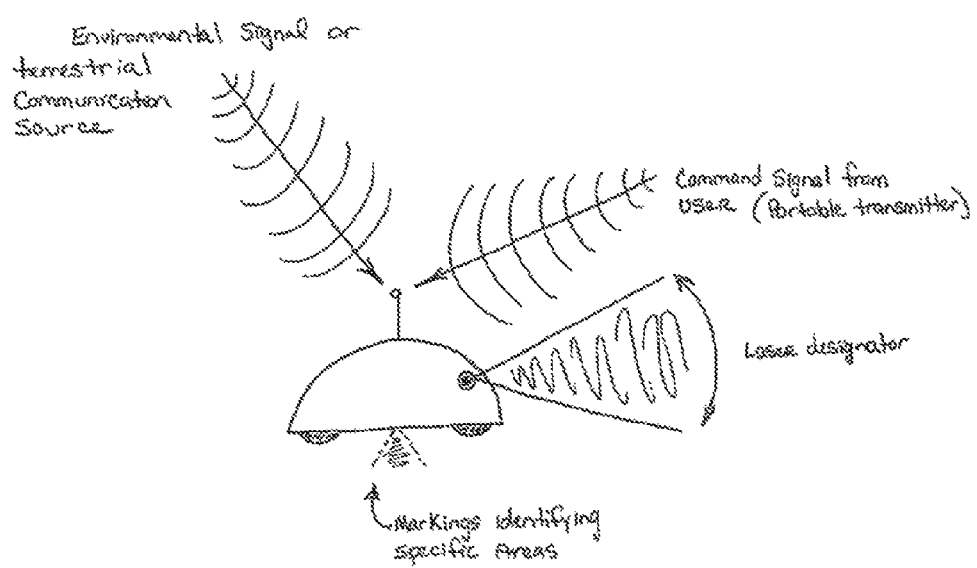
FIG. 14 is a schematic diagram showing a programmable robotic apparatus as described. The programmable robotic apparatus receives signals from a user (command signals), and signals from one or more terrestrial communication sources (environmental signals). The programmable robotic apparatus has a laser that operates as shown and described with regard to FIG. 13. The programmable robotic apparatus has a tool that allows the marking of surfaces to designate areas or locations.
Figure 15:
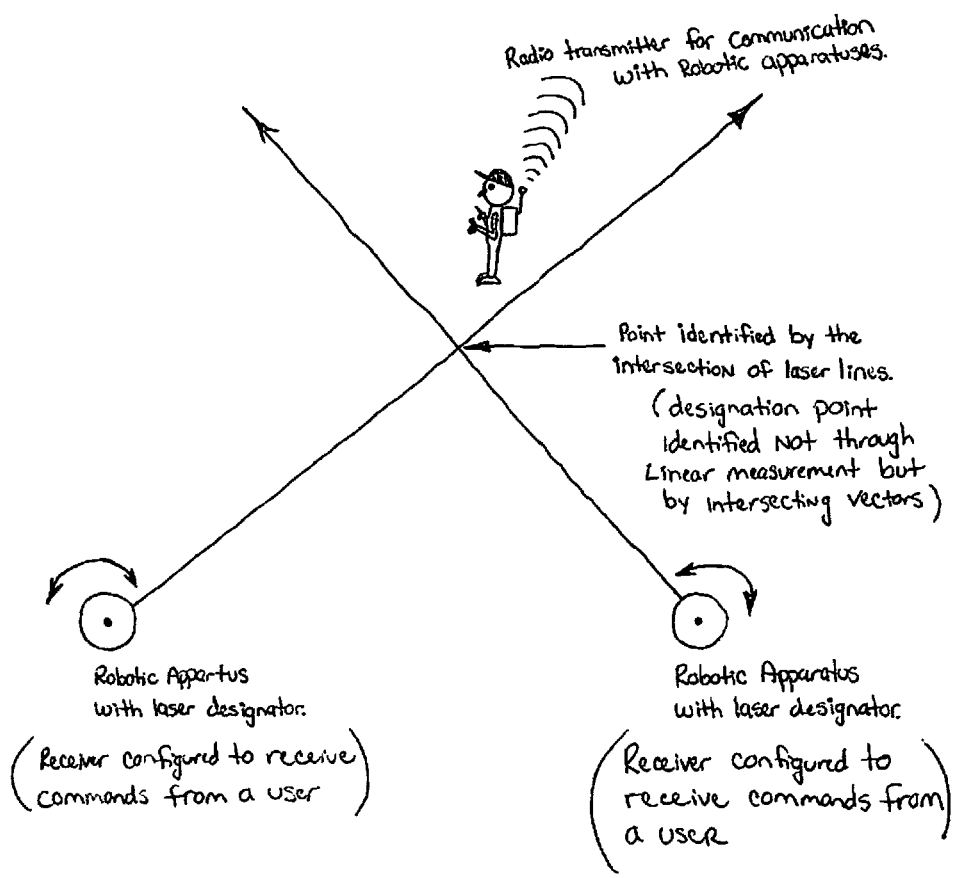
FIG. 15 is a schematic diagram that illustrates the operation of two robotic apparata as shown in FIG. 14 that are being operated by an operator.

FIG. 12 is a schematic diagram that shows a device with a plurality of transmitting antennas (e.g., Tx1, Tx2, Tx3) in a known configuration, here three antennas in a triangular configuration, such that by transmitting signals from the three antennas, the signals, if encoded with the information about each antenna, can be used to discern an orientation of the object upon which the antenna are placed.

Autonomous navigation using terrestrial signals versus non-terrestrial signals, such as those from local transmission sources is described. In one method of robotic navigation, one uses environmental signals from local transmission sources, to determine one's location using such techniques as time differentials and triangulation. The environmental signals from local transmission sources can comprise one or more of radio signals, cellular telephone signals, television broadcast signals, and wireless networks. Each type of signal has its own characteristics. The methods also can consider and take into account variables that can affect signal propagation, such as transmission distances, man-made and natural obstacles, atmospheric effects, and the effect of weather on signal transmission. Methods for limiting and overcoming signal attenuation that can be employed include one or more environmental sensors, perhaps in networks (such as weather or meteorological sensors), repetition and redundancy, predictive methods, and analysis of effects of the local terrain or site. Applications of the technology can include use in navigation and location for military and/or security purposes, for agricultural applications, for landscape maintenance, for construction, and for other tasks that are repeated from time to time, such as snow removal.

Laser Rangefinder Applications in Construction

There are several different applications.

One describes a user requesting a location. The request is sent to programmable platforms on the perimeter of a region, whereby when a user requests a point, each of at least two platforms is expected to spin and orient itself to align with that point, whereby each fires a laser line that intersects the users original point request. The use of two lasers mean an intersection point, or "cross-hair," is seen by the user. These lasers are "wall" lasers that deploy a spinning mirror aligned horizontally, whereby when activated, the laser line can be seen along the floor and or ceilings at the same time because of the spinning action. These lasers are not point lasers. No linear measurement is required. Because each laser knows it own position, no matter what position the user requests, the laser can orient itself to activate its tool function. Each laser line is expected to pass through the requested point, thereby creating a cross hair appearance. The user then can "mark" the spot requested.

The second laser system deploys a perimeter system with strips of laser diodes along the perimeter. These strips are expected to contain laser diodes capable of firing laser light clear to the other side of the area of interest. The system is expected to simulate an x,y grid. There are expected to be a plurality of strips aligning the perimeter. In a Cartesian coordinate embodiment, one represents "x" and the other represents "Y". Movement of the platform consists of a coordinated firing of lasers allowing the platform to "follow" or "track" the positions of light. In this embodiment, as many obstructions as possible be removed from the operating area. However coordinated light pulses can direct a platform.

Yet another method involves a current programmable system "marking" the floors with paint and or lasers, to layout a building for construction. The system is set up for this already, being that it is a programmable device performing a tool function, whether it be in motion and or at rest. The tool function is expected to be the marking system.

The Identification of a Requested Coordinate

In one example, a workman, such as a plumber, walks upon a concrete pad, whose dimensions are 100' by 150'. He begins by strapping on a harness which holds a laptop computer and a back pack that contains radio equipment. He places a disc into the drive, the disc containing information about a plumbing system to be laid out. On the screen comes a CAD image detailing the plumbing layout. He begins by selecting an area to layout by clicking on a particular pipe identified on the drawing. As he clicks on that item, the computer sends that request to the radio transmission equipment contained on his back. The data is sent wirelessly to robotic lasers bordering the concrete pad.

This transmission is not unique to one platform but can be read by any robotic platform within the receiving area. The signal is received and converted from an x, y coordinate to an angular determination based upon the individual platforms location on the pad. Each robotic platform when placed earlier on the pad, calculated where they were in relation to the CAD drawing. This is achieved through laser positioning from survey points.

The robotic platform once converting the coordinates to an angular determinate then turns to align itself on that particular angle. Once alignment has been completed, the platform activates a laser device essentially firing a laser line along that vector. There is no linear measurement involved here but simply a creation of a highlighted vector. A location is derived when two or more lasers cross lines.

Each laser independently derives its own alignment and fires a laser line that is designed to exceed the point of interest. This overlapping is deliberate as the true measurement comes when two or more lasers meet. The benefit here is that there is no linear measurement involved by either radio or laser sources. Such sources have limitations in accuracies whereas criss crossing vector lines seems to reveal a more accurate method.

This exemplary description of one particular tradesman is not limited to any one trade. This method can be deployed in a variety of applications involving positioning of walls and or mechanicals.

In one embodiment, each platform is expected to employ a digital magnetometer to identify bearings. These along with high resolution of gears is expected to determine angular determinants. Each robotic platform is expected to be programmable. They are expected to possess CAD specifications for each task. Each coordinate is then calculated to reveal necessary alignment. Each platform is expected to possess adaptable mounting harnesses unique to each particular brand of laser deployed. Each platform is expected to have a radio receiver module for the purposes of communication with a user. Each platform is expected to possess a motor control module. Each platform is expected to possess a CPU module for essential computations and overall control of other modules. Each platform is expected to operate autonomously from a user in determining fixed locations.

The Designation of a Path for an Autonomous Platform

A robotic platform is activated to begin traversing a concrete pad. At either end of this concrete pad, there are laser diodes contained within a plastic boarder. When activated, the robotic platform is expected to traverse along projected laser beams. These beams are expected to essentially guide the robotic platform similar to a railroad track, keeping it in check with the preset pathway.

These projected pathways can be alternated creating new guided pathways. A computer control module is expected to designate which diodes to activate and from which angle. Each pathway can either be straight and or angular. Each beam may also cease before the robot reaches the end as it may be directed to change coarse by activating an alternate beam while in motion.

A guided pathway may involve several projected beams, each from different positions before completing a task. Each platform is expected to possess sensors sensitive to laser light that is expected to control the platforms movement. Processing the position of the laser light is expected to reveal where the platform is in relation to the laser source.

In one embodiment, each robotic platform is expected to possess laser light sensors. Each Robot is expected to have a sensor control module. Each platform is expected to have a motor control module. Each platform is expected to have electrical communication between sensor and motor control modules. Each platform is expected to possess a central processing module. Each module is expected to possess a memory module in communication with CPU module. Each CPU module is expected to have communication with both motor control and sensor modules. Laser diodes are expected to be controlled by a CPU module. Each laser strip is expected to possess a memory and CPU modules. Pattern generation is expected to come from CPU and or memory module. Each laser strip is expected to possess radio receiver modules. Each robotic platform is expected to possess radio transmitter modules for communication with laser strips.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope of the following claims.

What is claimed is:

1. A programmable robotic apparatus comprising:
   at least two programmable platforms located within an area in which at least one location of interest is to be identified, each programmable platform having a laser mounted thereon, said laser configured to emit a laser beam configured to be emitted along a plurality of lines within a plane;
   a receiver configured to receive a command from a user;
   a computer coupled to said receiver and to each of said at least two programmable platforms, said computer configured to control said at least two platforms to operate each of said lasers mounted on said at least two programmable platforms to designate said location of interest as a location at which an emitted laser beam from a first of said at least two programmable platforms intersects an emitted laser beam from a second of said at least two programmable platforms;
   a drive system and a drive mechanism configured to provide a selected one of said at least two programmable platforms with mobility;
   a control module in electrical communication with said drive system, said control module configured to command the motion of the programmable robotic apparatus;
   a memory module in electrical communication with said control module, said memory module configured to store and retrieve information;
   a transmitter in electrical communication with said control module, said transmitter configured to transmit a signal comprising at least a unique identifier associated with the robotic apparatus; and
   a receiver in electrical communication with said control module, said receiver configured to receive a signal comprising location information;
   whereby said programmable robotic apparatus is able to discern at least one of a location and an orientation of said programmable robotic apparatus.

2. The programmable robotic apparatus of claim 1, wherein said apparatus is configured to operate autonomously based at least in part on information stored in said memory module.

3. The programmable robotic apparatus of claim 1, wherein said memory module is selected from the group consisting of a magnetic tape, a floppy disc, a hard disc, a CD-ROM, a CD-RW disc, RAM, EPROM, EEPROM, and a flash memory.

4. The programmable robotic apparatus of claim 1, wherein said programmable robotic apparatus is configured to discern at least one of a location and an orientation based on a reception or a transmission of at least one terrestrial environmental signal.

5. The programmable robotic apparatus of claim 1, wherein said at least one terrestrial environmental signal comprises one or more of a cellular telephone communication signal, a radio broadcast signal, and a television broadcast signal.

6. The programmable robotic apparatus of claim 1, further comprising a command receiver module in electrical communication with said control module.

7. The programmable robotic apparatus of claim 6, wherein said command receiver module is configured to receive signals from a portable transmitter.

8. A method of providing at least one command recorded on a machine-readable medium, the at least one command representing an instruction for traversing an area of interest, the method comprising the steps of:
   providing a programmable robotic apparatus according to claim 1;
   operating said programmable robotic apparatus under external control, the programmable robotic apparatus receiving directives from an external source and traversing an area of interest;
   taking readings from a receiver of said programmable robotic apparatus said receiver configured to receive a signal comprising location information; and
   recording said directives and readings on a machine-readable medium for later recovery.

9. The method of claim 8, wherein said directives are recorded in the format in which said directives are received.

10. The method of claim 8, wherein said directives are recorded in a different format from the format in which said directives are received.

11. A computer program recorded on a machine-readable medium for control of a programmable robotic apparatus according to claim 1, said computer program comprising:
   a supervisory module that controls the autonomous operation of a programmable robotic apparatus of claim 1 and that, as required, receives information recorded on a machine-readable medium;
   an orientation receiver module that derives orientation information from a signal received by a receiver of said programmable robotic apparatus, and
   a computation module that computes an error signal based at least in part on orientation information derived from said environmental signal detection module and information recorded on said machine-readable medium.

12. The computer program of claim 11, further comprising:
an instruction receiver module that receives directives from an external source regarding operation of said programmable robotic apparatus.

13. The computer program of claim 11, further comprising:
an error correction module that, in the event that said error signal exceeds a predetermined value, computes an error correction to be provided as a corrective action command to said programmable robotic apparatus.

14. The programmable robotic apparatus of claim 1, further comprising a plan drawing of said area in which at least one location of interest is to be identified, said plan drawing configured to be provided to a user in an interactive manner.

15. A method of operating a programmable robotic comprising the steps of:
providing a programmable robotic apparatus, comprising:
at least two programmable platforms located within an area in which at least one location of interest is to be identified, each programmable platform having a laser mounted thereon, said laser configured to emit a laser beam configured to be emitted along a plurality of lines within a plane;
a receiver configured to receive a command from a user; and
a computer coupled to said receiver and to each of said at least two programmable platforms, said computer configured to control said at least two platforms to operate each of said lasers mounted on said at least two programmable platforms to designate said location of interest as a location at which an emitted laser beam from a first of said at least two programmable platforms intersects an emitted laser beam from a second of said at least two programmable platforms;
providing a command issued by a user to said computer by way of said receiver to cause said computer to operate said each of said lasers to provide said designation of said location of interest;
providing to a selected one of said at least two programmable platforms additional apparatus comprising:
a drive system and a drive mechanism configured to provide said selected one of said at least two programmable platforms with mobility;
a control module in electrical communication with said drive system, said control module configured to command the motion of the programmable robotic apparatus;
a memory module in electrical communication with said control module, said memory module configured to store and retrieve information;
a transmitter in electrical communication with said control module, said transmitter configured to transmit a signal comprising at least a unique identifier associated with the robotic apparatus;
a receiver in electrical communication with said control module, said receiver configured to receive a signal comprising location information; and
at least one command recorded on a machine-readable medium, said at least one command representing an instruction for traversing an area of interest;
operating said programmable robotic apparatus according to said at least one command recorded on said machine-readable medium;
discerning at least one of a location and an orientation of said programmable robotic apparatus;
comparing said at least one of said location and said orientation of said programmable robotic apparatus to a corresponding one of a location and a direction recorded in said at least one command to determine an error signal; and
in the event that said error signal exceeds a predetermined value, commanding said programmable robotic apparatus to take a corrective action;
whereby said programmable robotic apparatus autonomously traverses an area of interest.

16. The method of claim 15, wherein the steps of discerning at least one of a location and an orientation, comparing at least one of said location and said orientation, and in the event that said error signal exceeds a predetermined value, commanding said programmable robotic apparatus to take a corrective action, are performed iteratively during a period of operation of said programmable robotic apparatus.

17. The method of operating a programmable robotic apparatus of claim 15, further comprising the step of providing to a user in an interactive manner a plan drawing of said area in which at least one location of interest is to be identified.

* * * * *